US010669463B2

(12) United States Patent
Bahr

(10) Patent No.: US 10,669,463 B2
(45) Date of Patent: *Jun. 2, 2020

(54) BIO-DERIVED COMPOSITION FOR DUST CONTROL

(71) Applicant: NDSU RESEARCH FOUNDATION, Fargo, ND (US)

(72) Inventor: James Allen Bahr, West Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,009

(22) Filed: Jul. 31, 2018

(65) Prior Publication Data

US 2018/0334603 A1     Nov. 22, 2018

Related U.S. Application Data

(63) Continuation-in-part of application No. 15/277,602, filed on Sep. 27, 2016, now Pat. No. 10,336,927.

(60) Provisional application No. 62/540,841, filed on Aug. 3, 2017, provisional application No. 62/234,896, filed on Sep. 30, 2015.

(51) Int. Cl.

| | |
|---|---|
| C09K 3/22 | (2006.01) |
| E01H 3/00 | (2006.01) |
| E01C 7/00 | (2006.01) |
| E02D 3/10 | (2006.01) |
| C11C 3/02 | (2006.01) |
| C11C 3/06 | (2006.01) |
| E01C 7/08 | (2006.01) |

(52) U.S. Cl.
CPC .......... *C09K 3/22* (2013.01); *C11C 3/02* (2013.01); *C11C 3/06* (2013.01); *E01C 7/08* (2013.01); *E01H 3/00* (2013.01); *E02D 3/10* (2013.01); *E01C 2301/50* (2013.01); *Y02E 50/13* (2013.01)

(58) Field of Classification Search
None
See application file for complete search history.

(56) References Cited

U.S. PATENT DOCUMENTS

| | | | |
|---|---|---|---|
| 2,632,712 | A | 3/1953 | Lemmon |
| 4,780,223 | A | 10/1988 | Baranet et al. |
| 6,589,442 | B1 | 7/2003 | Wilson et al. |
| 6,729,805 | B2 | 5/2004 | Wathen |
| 6,822,105 | B1 | 11/2004 | Luxem et al. |
| 7,108,800 | B2 | 9/2006 | Tran et al. |
| 7,398,935 | B2 | 7/2008 | Tran et al. |
| 8,163,059 | B2 * | 4/2012 | Tran .................... B01J 2/30 71/64.07 |

(Continued)

OTHER PUBLICATIONS

Ali et al., "Investigation of the impacts of aging and RAP percentages on effectiveness of asphalt binder rejuvenators," *Construction and Building Materials*, 2016; 110:211-217.

(Continued)

*Primary Examiner* — Katie L. Hammer
(74) *Attorney, Agent, or Firm* — Mueting, Raasch & Gebhardt, P.A.

(57) ABSTRACT

Bio-derived glycerides formed from a reaction between waste glycerol and biodegradable or bio-derived fatty acid esters such as crude biodiesel or soybean oil triglycerides are useful as dust suppressants, binders, and stabilizing agents.

30 Claims, 9 Drawing Sheets

(56) References Cited

U.S. PATENT DOCUMENTS

| | | | |
|---|---|---|---|
| 9,115,284 B2 | 8/2015 | Davis et al. | |
| 9,115,295 B2 | 8/2015 | Deneuvillers et al. | |
| 9,416,274 B2 | 8/2016 | Frank | |
| 10,336,927 B2 | 7/2019 | Bahr | |
| 2008/0248187 A1* | 10/2008 | Schoerken | A23D 9/013 |
| | | | 426/648 |
| 2008/0268094 A1* | 10/2008 | Cantini | C11C 3/02 |
| | | | 426/2 |
| 2009/0061101 A1 | 3/2009 | Cranfill et al. | |
| 2009/0127499 A1* | 5/2009 | Tran | C09K 3/18 |
| | | | 252/70 |
| 2009/0216040 A1 | 8/2009 | Benecke et al. | |
| 2011/0289830 A1 | 12/2011 | Hatcher et al. | |
| 2013/0058718 A1 | 3/2013 | Tran et al. | |
| 2014/0271928 A1* | 9/2014 | Rehage | A61K 8/97 |
| | | | 424/680 |
| 2014/0336301 A1 | 11/2014 | Webster et al. | |
| 2016/0145536 A1* | 5/2016 | Slade | C12P 7/649 |
| | | | 554/174 |
| 2017/0088760 A1 | 3/2017 | Bahr | |
| 2017/0247542 A1* | 8/2017 | Williams | C08L 95/00 |
| 2018/0334603 A1 | 11/2018 | Bahr | |

OTHER PUBLICATIONS

Bahr, "Research and Development of Soy Based Road Dust Suppressants at NDSU," *North Dakota State University*, Apr. 20, 2016, pp. 1-13.

Dokandari et al., "Implementing Waste Oils with Reclaimed Asphalt Pavement," Proceedings of the 2$^{nd}$ World Congress on Civil, Structural, and Environmental Engineering (CSEE'17), Barcelona, Spain, 2 Apr. 2017; Paper No. ICSENM 142:1-12.

Echeverri et al., "Glycerolysis of Crude Methyl Esters with Crude Glycerol from Biodiesel Production," J Am Oil Chem Soc., 2013; 90:1041-1047.

Hancock et al., "Studies in Autoxidation. Part II. An Evaluation of the By-Products Formed by the Autoxidation of Fatty Acid Modified Alkyd Resins Under the Influence of Different Promoters," *Progress in Organic Coatings*, 1989; 17:337-347.

Marti et al., "Aggregate Roads Dust Control: A Brief Synthesis of Current Practices," SRF Consulting Group, Inc., Minnesota Department of Transportation, Research Project, Jun. 2013, Final Report #2013RIC6.7.

Meffert, "Technical Use of Fatty Acid Esters", *J. Am. Oil Chem. Soc.*, 1984; 61:255-258.

Noureddini et al., "A Continuous Process for the Glycerolysis of Soybean Oil," JAOCS, 2004; 81(2):203-207.

Noureddini et al., "Glycerolysis of Fats and Methyl Esters," JAOCS, 1997; 74(4):419-425.

Pan et al., "Novel biobased epoxy compounds: epoxidized sucrose esters of fatty acids," *Green Chem.*, 2011, 13(4): 965-975.

Pan, Xiao, Ph.D. Dissertation, May 2011, Novel Biobased Resins Using Sucrose Esters of Plant Oils, Department of Coatings and Polymeric Materials, College of Science and Mathematics, North Dakota State University, ProQuest Publ. No. 3492419.

Sonntag, "Glycerolysis of Fats and Methyl Esters—Status, Review, and Critique," *Journal of the American Oil Chemists Society*, Oct. 1982; 59(10):795A-802A.

Sun et al., "Properties of asphalt binder modified by bio-oil derived from waste cooking oil," Construction and Building Materials, 2016; 102:496-504.

Yan et al "Dust Suppression with Glycerin from Biodiesel Production: A Review," *Journal of Environmental Protection*, Published Online Feb. 2012; 3:218-224.

\* cited by examiner

BIO-DERIVED COMPOSITION FOR DUST CONTROL

INCORPORATION BY REFERENCE OF RELATED APPLICATIONS

This application claims the benefit of U.S. Provisional Application Ser. No. 62/540,841, filed Aug. 3, 2017; this application is also a continuation-in-part of U.S. patent application Ser. No. 15/277,602, filed Sep. 27, 2016, which claims the benefit of U.S. Provisional Application Ser. No. 62/234,896, filed Sep. 30, 2015, each of which is incorporated herein by reference in its entirety.

BACKGROUND

Road dust is a widespread problem in the United States, Canada, and other countries in rural areas where the majority of roads are unpaved. In the United States alone, over $400 million is spent annually on dust control. Mining operations also generate large amounts of dust due to heavy traffic. This dust creates an environmental hazard that impacts crops as well as the health of peoples living and working in these areas. Road dust generation also results in excess erosion of gravel roads and increased maintenance cost associated with their upkeep.

Glycerol (also known as glycerin) has been shown to be an effective dust suppressant when applied to gravel roads directly or as an aqueous solution with surfactants, polymers and other chemicals (Yan et al., J. Environ. Prot., 2012, 3:218-224). However, it has also been shown that glycerol can have a negative environmental impact as it is water soluble and can be washed away from the road surface by rainfall and end up in the adjacent surface ground water killing plants and animals due to its high biological oxygen demand (Yan et al., J. Environ. Prot., 2012, 3:218-224).

SUMMARY OF THE INVENTION

The rapidly growing biodiesel industry is faced with an excess of crude glycerol that is expensive to purify and expensive to dispose of. This present invention is directed to the conversion of cheap, crude glycerol (preferably from biodiesel waste) into a non-toxic, biodegradable and non-corrosive bio-derived material (biomaterial) useful for dust control as well as other applications, such as use as a binder or stabilizer for road construction materials. Moreover, in addition to making productive use of a major biodiesel waste product, glycerol, the conversion process can utilize biodiesel itself as a reactant, thereby providing a further market for the biodiesel.

Bio-derived glycerides can be produced from a reaction between glycerol and a biodegradable or bio-derived fatty acid ester. Exemplary biodegradable or bio-derived fatty acid esters include plant oils such as soybean oil, animal fats, or fatty acid methyl esters (FAME), such as biodiesel. The bio-derived fatty acid ester can include crude (e.g., unpurified or only partially purified) biodiesel. Mixtures of bio-derived glycerides formed from a reaction between waste glycerol and biodegradable or bio-derived fatty acid esters such as crude biodiesel or soybean oil triglycerides were found to be useful as dust suppressants.

Thus, in one aspect, the invention provides a composition containing biomaterial that includes a mixture of bio-derived glycerides. The mixture of bio-derived glycerides can include at least one monoglyceride, at least one diglyceride, at least one triglyceride, or any combination thereof. Preferably the mixture of bio-derived glycerides includes at least one monoglyceride, at least one diglyceride, and at least one triglyceride. In one embodiment of the composition, the bio-derived glycerides are heterogeneous. For example, the bio-derived glycerides may be heterogeneous because they are obtained from a biomaterial, such as a plant oil, containing heterogeneous fatty acid groups. The composition may be formulated for any suitable use; for example, it can be formulated for use as a dust control agent, as a binder material, a stabilizing agent, and/or as an additive for use in polymeric compositions.

In addition to bio-derived glycerides, the composition optionally includes glycerol. The glycerol can be residual glycerol or unreacted glycerol remaining after reaction of the glycerol reactant with the bio-derived fatty acid ester. In one embodiment, the glycerol is obtained from an organic waste stream. The glycerol can include crude (e.g., unpurified or only partially purified) glycerol.

Optionally, the composition includes at least one additive. Exemplary additives include, without limitation, a dust control agent, a cross-linking agent, a drying agent, a hygroscopic agent, a stabilizing agent, and a defoaming agent.

The composition optionally includes water. The bio-derived glycerides may have amphiphilic character; thus, an aqueous composition can take the form of an emulsion, suspension, dispersion, and the like.

In another aspect, the invention provides a method for making a biomaterial. Glycerol and a biodegradable or bio-derived fatty acid ester are reacted under conditions to produce a biomaterial that includes a mixture of one or more monoglycerides, diglycerides, and/or triglycerides. Preferably, the resulting mixture includes at least one monoglyceride, at least one diglyceride, and at least one triglyceride. Optionally, the resulting mixture includes unreacted glycerol. In one embodiment, the glycerol reactant includes crude glycerol from an organic waste stream. In one embodiment, the biodegradable or bio-derived fatty acid ester comprises at least one of soybean oil or biodiesel. The biodiesel can be crude biodiesel.

In yet another aspect, the invention provides a method for controlling dust on a surface. The method includes applying a bio-based dust control agent that includes one or more of the composition, biomaterial or bio-derived glycerides of the invention to the surface to be treated. The surface to be treated can be a road or soil surface, an equipment surface, or any surface in need of dust control. In one embodiment, the composition that is applied to the surface to be treated is an aqueous composition, wherein the biomaterial is dispersed, suspended or emulsified in the aqueous composition. The method for controlling dust on a surface optionally includes applying a cross-linking agent or drying agent to the surface before, during or after application of the biomaterial.

In another aspect, the invention provides a method for making a material, such as a road construction material, that includes incorporating the composition, biomaterial, or bio-derived glycerides of the invention into the material. The road construction material can include gravel. Asphalt, including recycled (also known as reclaimed) asphalt, is one example of a gravel component of a road construction material. The invention further provides a road construction material, such as gravel, that contains the composition, biomaterial, or bio-derived glycerides of the invention. Also provided by the invention is a road surface or roadbed that incorporates the composition, biomaterial or bio-derived glycerides of the invention.

The biomaterial of the invention possesses many advantages over other dust control or stabilizing agents, advantages that are described throughout this disclosure. The collective presence of mono-, di-, and triglycerides in the biomaterial imparts both hydrophobic and hydrophilic qualities to the mixture, and this amphipathic character provides unique benefits. For example, the abundance of hydroxyl groups in the mono- and diglycerides, as well as on any unreacted glycerol, make the mixture far easier to disperse in water compared to oily products in use as dust control agents, such as waste French fry oil and soapstock. Additionally, these common oily dust control products need to be heated in advance of application and covered with sand for traction and containment. In contrast, pre-application heating and post-application sand cover is not necessary in order to use the biomaterial of the present invention as a dust control agent.

The biomaterial is superior to water-soluble dust control agents, such as magnesium and calcium chloride dust control agents, as well. Because it is water miscible but not water soluble, the biomaterial will not wash away from roads or soil in the rain, like water soluble agents do. The biomaterial also exhibits superior dust performance compared to the chlorides when the humidity is very low, because the chlorides rely on their hygroscopic nature to dampen the gravel, and if there is little moisture in the air, there is insufficient moisture for the chlorides to sequester into the gravel. And, unlike salt-based dust control agents, the biomaterial is noncorrosive to vehicles and road infrastructure.

Additionally, the biomaterial forms a crosslinked network after drying, resulting in a higher molecular weight structure. It was surprisingly found that, when the biomaterial was applied to gravel and cured, not only was it able to inhibit airborne release of dust particles, but it also prevented "loss of fines" after mechanical challenge. The integrity and stability of a gravel surface depends on the mix of different particle sizes and types that allow for optimal packing. By promoting retention of fine particles within the bulk of the treated gravel, the biomaterial has unexpected additional benefits such as inhibiting the gradual breakdown of the gravel surface due to "loss of fines" that would otherwise lead to the formation of potholes, pocking, chipping, fissures, roadway silt, and the like. Use of the biomaterial as a dust control agent may therefore also lengthen the time between the need for resurfacing and regrading of gravel roads.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

Also herein, the recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

The above summary of the invention is not intended to describe each disclosed embodiment or every implementation of the invention. The description that follows more particularly exemplifies illustrative embodiments. In several places throughout the application, guidance may be provided through lists of examples, which examples can be used in various combinations. In each instance, the recited list serves only as a representative group and should not be interpreted as an exclusive list.

DESCRIPTION OF ILLUSTRATIVE EMBODIMENTS

Figure 1:
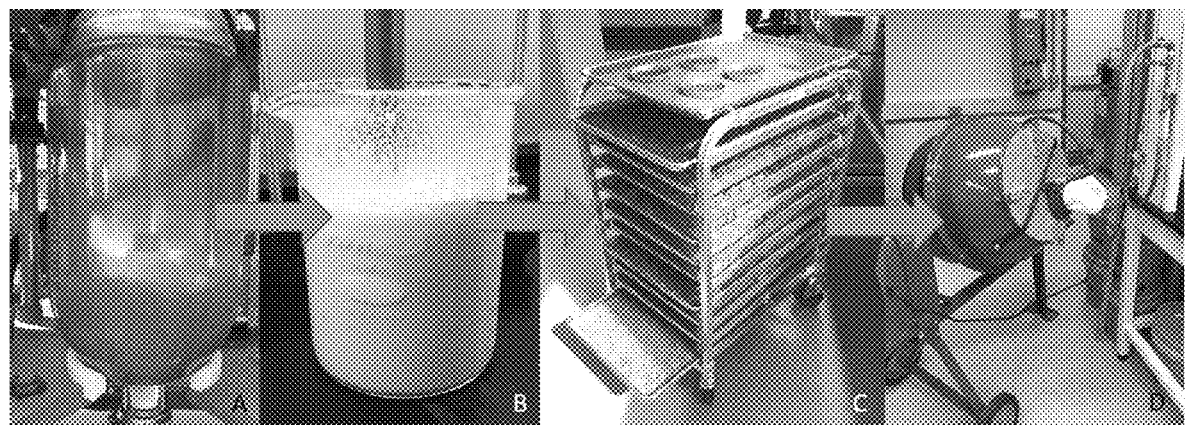
FIG. 1 depicts the workflow used for the synthesis and testing of soy based dust control agents. Panel A shows a10-liter reactor for synthesis of glycerides from glycerol and biodiesel. Panel B shows emulsification of raw product with water at a 1:3 ratio. Panel C shows application of emulsion to class 5 gravel followed by drying/curing. Panel D shows testing of treated gravel for dust particle retention.

This present invention involves the conversion of glycerol into a non-toxic, non-corrosive dust suppressant biomaterial by reacting it with one or more bio-derived or biodegradable fatty acid esters such as found in a plant oil or animal fat, or a fatty acid methyl ester (FAME) such as biodiesel. The glycerol reactant can be conveniently obtained from the waste stream generated by the production of biodiesel. The glycerol can be crude glycerol, or it can be partially or fully purified. The resulting biomaterial, which contains a combination of one or more bio-derived monoglycerides, diglycerides, and/or triglycerides, can be employed to control or suppress natural or anthropogenic dust. For example, it can be dispersed in water for spray application onto gravel roads for dust control.

Plant oils that can be reacted with the glycerol reactant to yield bio-derived glycerides include vegetable oils, such as soybean oil, linseed oil, tung oil, oiticica oil, perilla oil, safflower oil, sunflower oil, castor oil, cotton seed oil, flax seed oil, grape seed oil, high oleic soybean oil, palm oil, palm kernel oil, olive oil, canola oil, rapeseed oil, and corn oil; oil from trees or wood pulp such as tall oil and palm oil, or nut-based oils such as cashew oil and peanut oil. Vegetable oils typically include at least one triglyceride and contain esters from fatty acids such, for example, oleic acid, stearic acid, linoleic acid, linolenic acid, palmitic acid, lauric acid, myristic acid, arachidic acid, and palmitioleic acid. More generally, aliphatic plant compounds of any type, including individual isolated, purified and/or derivatized plant-derived fatty acid molecules, can be used in the reaction to produce the bio-derived glycerides. It should be understood that the synthesis of the bio-derived glycerides can employ essentially any plant oil, any animal fat, plant and animal waxes including insect waxes (provided the wax contains fatty acid esters), or other fatty esters as the raw material. While the invention is described, for convenience, primarily with respect to plant oil-derived fatty acid esters, particularly those derived from soybean oil, it should be understood that any bio-derived fatty acid ester can be utilized as a reactant.

A preferred bio-derived fatty acid ester for use as a reactant is a fatty acid methyl ester (FAME), in particular, biodiesel. Biodiesel is a heterogeneous fatty acid methyl ester formed by reacting triglycerides present in a plant oil, including any vegetable oil such as soybean oil, in a transesterification reaction with methanol. The biodiesel reactant can be crude biodiesel, or it can be partially or fully purified. Advantageously, the present invention provides an opportunity to not only make use of a waste product (glycerol) generated during the synthesis of biodiesel, but also to utilize biodiesel directly, as the fatty acid ester reactant. Optionally, the biomaterial can be formed from a reaction between bio-derived glycerol and a petroleum-derived fatty acid ester, but bio-derived fatty acid esters are preferred reactants.

The resulting biomaterial includes one or more bio-derived glycerides, such as bio-derived monoglycerides, diglycerides, and triglycerides. The term "bio-derived glyceride" refers to the reaction product of a glycerol reactant and one or more bio-derived or biodegradable fatty acid esters such as found in a plant oil or an animal fat, or a fatty acid methyl ester (FAME), e.g., biodiesel. The biomaterial can be heterogeneous; for example, it can include a multiplicity of different monoglycerides, diglycerides, and/or triglycerides which are produced in the reaction of glycerol with, for example, a plant oil or biodiesel (derived from plant oil), since plant oils (as well as animal fats) contain triglycerides having heterogeneous fatty chains.

Components of an exemplary biomaterial of the invention include (values shown in wt %):
monoglyceride (2-20%)
diglyceride (30-80%)
triglyceride (10-40%)
glycerol (0-20%)

A typical biomaterial, intended to be non-limiting, includes 10% monoglyceride (suitable range, 5%-15%); 55% diglyceride (suitable range, 45%-65%); 25% triglyceride (suitable range, 15%-35%); and 10% glycerol (suitable range, 5%-15%) (values shown in wt %). An exemplary biomaterial can include about 10% monoglyceride, about 55% diglyceride, about 25% triglyceride, and about 10% glycerol (values shown in wt %).

The biomaterial produced by the reaction of glycerol with a bio-derived or biodegradable fatty acid ester yields a concentrate that may or may not be suitable for direct application to a surface such as a road surface without further processing; preferably, the concentrate is diluted and/or formulated for application to a surface by, for example, dissolution, dispersion, suspension or emulsification in a suitable buffer or solvent.

Thus, in another aspect, the invention provides a composition that includes the biomaterial of the invention, and a buffer or solvent. Preferably the composition is an aqueous composition, with water employed as a buffer or solvent. An exemplary aqueous composition contains between 5% and 35% biomaterial, by weight; preferably the aqueous composition contains between 15% and 30% biomaterial, by weight; a typical aqueous composition is about 25% biomaterial and 75% water, by weight. At more dilute concentrations of biomaterial, application rates need to increase in order to attain the same dust control effect. The aqueous composition can take the form, without limitation, of a solution, suspension, dispersion, emulsion, or colloidal suspension. In one embodiment, the composition is formulated for use in applications for controlling or suppressing natural or anthropogenic dust, such as road dust from gravel roads, by way of spraying, coating, or performing other types of surface modification or application procedures.

The composition may include, as a first dust control agent, a biomaterial of the invention, and optionally one or more additives. For example, the composition can include as an additive one or more second dust control agents. Dust control agents include, for example, water absorbing agents such as calcium chloride brine, magnesium chloride brine, and sodium chloride; organic petroleum products such as asphalt emulsions, cutback asphalt, dust oils, and modified asphalt emulsions; organic nonpetroleum products such as animal fats, plant oils, including vegetable oils, lignosulfonate, molasses or sugar beet products, tall oil emulsions; electrochemical products such as enzymes, ionic compounds, and sulfonated oils; synthetic polymer products such as polyvinyl acetate or vinyl acrylic; or clay additives such as bentonite and montmorillonite.

Additionally or alternatively, the composition can include as an additive one or more agents that assist with cross-linking, curing, or drying of the bio-derived glycerides upon application to the intended surface. Drying agents that can accelerate the drying process and promote cross-linking once the solution is applied to the road surface, include, without limitation, cobalt, zinc, manganese and zirconium based materials.

Additionally or alternatively, the composition can include as an additive one or more hygroscopic agents, including inorganic salts such as calcium chloride and magnesium chloride. The addition of salts can also lower the freezing point of the composition.

Other optional additives include stabilizing agents such as surfactants, emulsifiers, and the like to improve the emulsion stability of the composition and optionally to promote the cross-linking reaction. Examples of other additives include lecithin, metathesized soybean oil, food waste oil, such as French fry oil, thermally treated soybean oil or linseed oil based materials, and sucrose esters, as well as other fatty acids, fatty acid esters, and methyl esters. Sucrose esters can create larger crosslinked networks to further stabilize the material once it is dried and cured on a road surface. An example is a sucrose octaester, which provides eight fatty acid chains all tied to a central sucrose molecule. See, for example, Pan, Xiao, Ph.D. Dissertation, May 2011, Novel Biobased Resins Using Sucrose Esters of Plant Oils, Department of Coatings and Polymeric Materials, College of Science and Mathematics, North Dakota State University, ProQuest Publ. No. 3492419; Pan et al., Green Chem., 2011, 13(4): 965-975; U.S. Pat. Publ. 20140336301, published Nov. 13, 2014.

Additionally or alternatively, the composition can include as an additive one or more defoaming agents in order to reduce foam formation during the emulsification process. Exemplary defoaming agents include, but are not limited to, insoluble oils, polydimethylsiloxanes and other silicones, alcohols, stearates and glycols.

It should be understood that many of the additives that can be employed in the composition may have multiple functions and enhance the effectiveness of the composition in multiple ways.

In another embodiment, the composition can be formulated as a roadbed or fill material. For example, the biomaterial of the invention can be incorporated into the road surface composition itself, for example, by being applied to a gravel composition before its use to form, construct or fill the road surface. Accordingly, the invention also encompasses a method for making a road or roadbed utilizing a composition of the invention.

In another embodiment, the composition can be formulated for use as a gravel stabilization composition, which can be used to increase the useful life of gravel. Accordingly, the invention also encompasses a method for stabilizing a gravel road by applying the composition of the invention to the road during or subsequent to its construction.

In another aspect, the invention provides a method for applying the biomaterial of the invention to a surface, such as a gravel road surface, for the control and/or suppression of dust, for example road dust. More generally, the biomaterial of the invention can be applied for dust control or suppression anywhere ambient dust is a problem, for example on gravel roads or sand, mining properties, including coal and/or mining conveyer belts, construction and demolition sites, and any outdoor location where dust production needs to be controlled. The biomaterial can be directly applied to a surface such as a road surface, or it can be applied as a composition that may include other components. A surface application rate can be any rate suitable for the intended purpose. Exemplary surface application rates can range from 0.2 gal/yd to 1.0 gal/yd; more preferably from 0.3 gal/yd$^2$ to 0.6 gal/yd$^2$. An exemplary application rate is between 0.4 gal/yd$^2$ and 0.5 gal/yd$^2$, for example about 0.45 gal/yd$^2$. The biomaterial can also be used to stabilize soil; for example, it can be applied to stabilize soil in farm fields, on vertical inclines along roadsides or in ditches, or along the gravel shoulders alongside paved roads.

The biomaterial is particularly well-suited to applications involving asphalt and recycled asphalt. It has been surprisingly found that, when applied to deteriorating gravel road surfaces formed from recycled asphalt, the biomaterial interacts with the recycled asphalt to regenerate a firm and stable road base. Thus, in one embodiment, the composition of the invention includes asphalt and/or recycled asphalt, and the biomaterial. The composition can be formulated, for example, as a roadbed material, fill material, or overlay material, for use in new construction, or as a material to be applied to an existing road surface, which road surface can be a new road surface or a worn or deteriorated road surface. The biomaterial can be incorporated into a roadbed or fill material as, for example, a binder or softening agent during construction of the road bed, or incorporated into an overlay material applied to the road surface as a binder, softening agent, or for added dust control. An illustrative composition is an asphalt mix that includes recycled asphalt and the biomaterial. Advantageously, the biomaterial may impart dust control, binder, and/or softening properties to the asphalt mix. Compositions formulated using soy-based material as a source of the bio-derived or biodegradable fatty acid reactant are particularly preferred for use on or with recycled asphalt.

In another embodiment, the invention provides methods for using the biomaterial to treat, stabilize, or control dust on a road surface containing asphalt or recycled asphalt. In one embodiment, method includes forming a road, roadbed, or road surface overlay, by applying the composition comprising the asphalt and/or recycled asphalt and the biomaterial to a surface, for example a graded surface, during road construction, or by applying the composition as an overlay on an existing road surface. Optionally, the method includes mixing the biomaterial into the asphalt or recycled asphalt composition prior to use in forming the road, roadbed, or overlay. In another embodiment, the method includes applying the biomaterial to an existing road surface, wherein the existing road surface contains asphalt or recycled asphalt. The road surface may be a new road surface or a worn or deteriorated road surface. The invention further includes a method for rejuvenating a gravel road formed from asphalt or recycled asphalt by applying the composition of the invention to the deteriorated road surface so as to improve and stabilize the road base. The biomaterial may provide dust control and/or stabilization to the existing road surface. When applied to an existing road surface, the biomaterial may penetrate the existing road surface. For example, the biomaterial may penetrate 1 inch, 2 inches, 3 inches or more into the existing road surface. When utilized as a component of a road, roadbed, fill, or overlayer composition in connection with road construction or resurfacing, the biomaterial may be dispersed throughout the road, roadbed, fill or overlayer.

In some embodiments, the method for applying the biomaterial includes the application of two or more compositions. For example, compositions that include cross-linking or drying agents can be applied concurrently with the biomaterial composition so as to permit the cross-linking reaction to occur on the road surface. Two or more compositions can be combined from two or more feed streams into a single stream for purposes of effective application. Alternatively, a composition that includes the cross-linking or drying agents can be applied to the road surface after application of the biomaterial of the invention. Upon application to a road surface, the bio-derived glycerides are expected to undergo crosslinking reactions to form larger, more stable molecular structure, such as cross-linked polymers. More generally, one or more additives can be included in one or more separate feed streams during application of the aqueous solution to a surface, and/or applied to the surface before or after application of the aqueous solution.

In yet another aspect, the invention provides a method for making the biomaterial of the invention, which method includes reacting a source of glycerol with one or more bio-derived or biodegradable fatty acid esters such as found in a plant oil or an animal fat, or a fatty acid methyl ester, such as biodiesel. A typical reaction mechanism proceeds by transesterification. Preferably, the molar amount of fatty acid ester to glycerol is selected such that 1 to 2 free alcohol groups, on average, remain on the glycerol molecule after reaction. The free alcohol groups serve to absorb moisture from the air and make the resultant mono/di-glyceride water dispersible. In a preferred embodiment, the glycerol reactant is advantageously obtained from an organic waste stream, for example an organic waste stream produced by the production of biodiesel. In addition to the organic waste stream generated by the production of biodiesel, any organic waste stream that includes glycerol can serve as a source of glycerol for the production of the biomaterials described herein. For example, waste sources such as garden and park waste, food and kitchen waste, household waste, restaurant and catering waste, retail premises waste, and food processing plant waste can serve as sources of glycerol. Waste streams that include glycerol are typically those produced by processing plant oils, animal fats, and other naturally occurring triglycerides into other products. Wastes that may need pre-treatment or pre-processing in order to supply glycerol, such as forestry and agricultural residues, manure, sewage sludge, nature textiles, paper and processed wood, may also be used, optionally in combination with a pre-processing step to make glycerol available for reaction with the plant oil.

In an exemplary method, glycerol is reacted with a fatty acid ester under conditions to produce a composition that contains a mixture of reaction products. The mixture of reaction products includes one or more monoglycerides, diglycerides, and/or triglycerides. The fatty acid ester can be, for example, a triglyceride present in or obtained from a plant oil or animal fat. As another example, the fatty acid ester can be a fatty acid methyl ester (FAME), for example, biodiesel. Advantageously, crude biodiesel can be used without purification. The glycerol is preferably a waste product generated from the synthesis if biodiesel. Advantageously, the crude glycerol waste product can be used without purification.

In reactions that utilize biodiesel as the fatty acid methyl ester reactant, the ratio of moles of biodiesel reactant to moles of glycerol reactant can be between 0.5:1 and 3:1 (biodiesel:glycerol). Preferably the ratio biodiesel:glycerol is between 1:1 and 2:1; more preferably between 1:1 and 1.5:1; even more preferably between 1.1:1 and 1.3:1. An exemplary ratio of biodiesel to glycerol is about 1.2:1.

The reaction time is between 15 minutes and 3 hours; preferably it is between 30 minutes and 2 hours; more preferably between 45 minutes and 90 minutes. An exemplary reaction time is about 60 minutes.

The synthetic process can be adjusted to yield the intended proportion of monoglycerides and/or diglycerides, or even triglycerides, by varying reaction conditions such as time, temperature, reactant ratio, and catalyst type.

Optionally, the reaction that produces the biomaterial includes a catalyst, preferably a base catalyst, such as sodium hydroxide, calcium hydroxide, sodium methoxide, or potassium hydroxide. An exogenous catalyst can be added to reaction; alternatively, the residual catalyst, such NaOH, present in a crude reactant (e.g., crude glycerol and/or crude biodiesel) as a result of the esterification used to produce the reactant may be present in sufficient quantity to catalyze the reaction without the addition of exogenous catalyst.

The biomaterials and compositions described herein are superior to current dust suppressants because they are non-corrosive, environmentally friendly, and expected to be less prone to removal by elements, such as rain or snow, or mechanical shearing such as due to road traffic. Vegetable oils and glycerol are known to deplete the oxygen content of water and wetlands, which can cause damage to wildlife (Yan et al., J. Environ. Prot., 2012, 3:218-224). The biomaterials of the invention are superior to glycerol, for example, because esterified glycerol (i.e., the mono-, di-, and triglycerides) is less likely to wash off of the road surface and accumulate in the ground water due to its low water solubility and to the formation of cross-linked structures. Yet, at the same time, a number of hydroxyl groups remain on the glycerides, such that they remain relatively hygroscopic, a desirable feature for a dust control composition, such as a road dust control composition. The biomaterials of the invention are superior to the use of salts, as well, since high salt usage rates can damage the environment, corrode metals, and cause scaling or surface damage to concrete (Cranfill et al., U.S. Pat. Pub. 2009/0061101); if salts are used in the compositions of the invention, a lesser amount of salt can be used than in conventional applications. The weatherability of these biomaterials is likewise superior to existing treatments; their low water solubility prevents them from being dissolved by rain and washed away, and cross-linking of these materials, as in certain embodiments of the invention, can prevent them from re-emulsifying in wet traffic and subsequent removal from the road surface.

EXAMPLES

The invention is illustrated by the following examples. It is to be understood that the particular examples, materials, amounts, and procedures are to be interpreted broadly in accordance with the scope and spirit of the invention as set forth herein.

Example I

Biodiesel Waste for Production of Biomaterial for Road Dust Control

Biodiesel is a form of diesel fuel manufactured from vegetable oils, animal fats, or recycled restaurant greases. Currently, the major feedstock for biodiesel production in the United States is soybean oil. The conventional production of biodiesel involves a chemical reaction called transesterification where soybean oil triacylglycerides are reacted with methanol catalyzed by either a strong acid or base catalyst. Most biodiesel production today uses a base catalyst because of its high conversion rate, low cost and minimal side reactions. The transesterification reaction produces a significant waste stream of crude glycerol that can be as much as 10% by weight of the biodiesel produced. For example, in 2013 over 180 million gallons of crude glycerol were generated as a waste stream from biodiesel production. The crude glycerol generated from soybean oil feedstock contains 67.8% pure glycerol along with methanol, free fatty acids, base catalyst and soaps. The glut of crude glycerol produced by the biodiesel industry has been expensive to purify and expensive to dispose of. However, with the expected growth of the biodiesel industry, glycerol production is expected to outpace the current market demand for glycerol driving the cost of crude glycerol down to less than $0.05 per lb.

The invention provides a chemical process that modifies the glycerol produced as a byproduct of biodiesel production with soybean oil to produce a mixture of mono, di and triglycerides that can be applied to gravel roads with or without a crosslinking agent to produce a web-like polymeric structure that binds the dust suppressant material to the gravel matrix so that it is not water soluble and consequently washed away into the ground water. Furthermore, converting the glycerol to mostly mono and diglycerides leaves unreacted hydroxyl groups free to absorb moisture from the air making it hygroscopic and wet. This is the mode of action of current road dust suppression salts such as magnesium chloride. Additionally, the soy based glyceride mixture will not be corrosive like the salt based dust suppressants currently in use today. Finally, the ester bonds present in the fatty acid structure will make it biodegradable so that it does not accumulate in the environment.

Glycerol can be obtained as the crude glycerol waste product from biodiesel synthesis or synthesized directly from soybean oil, then reacted with soybean oil to generate a high percentage of mono and diglycerides. The curing of the glyceride mixture is studied with and without crosslinking agents. Class 5 gravel is then treated with glyceride/water solutions, and tested for glyceride leaching behavior due to rainfall. Finally, the dust control properties of modified glycerol are measured in the lab and compared to magnesium chloride treated gravel.

Crude glycerol is combined with soybean oil in a chemical reaction to generate a concentrated solution of mono- di- and triglycerides that can be dispersed in water and sprayed onto gravel roads to serve as a dust control agent. Various mixtures of these materials are tested for dust control and water stability in the lab with class 5 gravel and compare their performance with magnesium chloride, a widely used dust suppressant.

The high degree of unsaturated carbon bonds within the fatty chains of the soybean oil allow the oil to "dry" by forming crosslinks between the chains creating a semi-continuous polymer network. These crosslinks form naturally when exposed to air or can be accelerated with the addition of crosslinking agents known as dryers.

Exemplary compounds that can be employed as reactants for reaction with the crude glycerol to attach fatty acid chains to the glycerol molecule include fatty acid methyl esters (FAME, such as in biodiesel) or fatty acid esters (such as in vegetable oil, e.g., soybean oil as mentioned above). Fatty acid glycerides can be prepared by direct esterification of fatty acids or their alkyl esters with glycerol. The chemical reactions involved are reversible and result in the formation of mono-, di- and triglycerides. Water or alcohol is also formed in the reaction as a byproduct. This reaction, also known as glycerolysis of fats and oils, produces industrially important mono- and diglycerides that have many applications as surfactants and emulsifiers in a wide range of foods, cosmetics, and pharmaceutical products (Meffert, 1984, Technical Uses of Fatty Acid Esters, J. Am. Oil Chem. Soc. 61:255-258).

The glycerolysis reaction in which fatty acid esters and vegetable oils undergo a transesterification reaction with glycerol is a physicochemical process and requires high temperatures (210-260° C.) and the use of an inorganic catalyst, such as sodium, potassium, or calcium hydroxide. Glycerolysis of fats and oils with glycerol has been intensively studied as widening industrial uses were found for monoglyceride in the 1940s and 1950s (Sonntag, 1982, Glycerolysis of Fats and Methyl Esters—Status, Review, and Critique, *Ibid.* 59:795A-802A).

The synthetic process can be adjusted to yield the intended proportion of monoglycerides and/or diglycerides, or even triglycerides in the resultant biomaterial. As noted, the presence of monoglyceride is advantageous because the remaining hydroxyl groups on the glycerol backbone render the biomaterial hygroscopic. On the other hand, the presence of diglyceride in the dust control agent is also beneficial as it allows for a larger crosslinked network to form. It is also possible that the presence of triglycerides will expand the crosslinking network even further. Nonetheless, a larger proportion of monoglyceride is generally desirable not just to increase hygroscopicity but also to minimize the cost of the starting materials. (i.e., it utilizes the most waste glycerol).

After the glycerides have been synthesized, they are dispersed in water and sprayed onto gravel samples in the lab and allowed to thoroughly dry. The treatment is then washed with water to determine how stable this material is expected to be when saturated with rain water. The treated gravel is tested for dust formation by passing air through the samples while collecting the dust onto filter paper. Comparisons can be made to both untreated gravel and to gravel treated with magnesium chloride.

Shown below is a schematic representation of crosslinked (CL) monoglycerides (MG) showing the hygroscopic (water absorption) behavior of the glycerol component that keeps the material wet.

Defoaming agents may also be added to reduce foam formation during the emulsification process. Defoaming agents include, but are not limited to, insoluble oils, polydimethylsiloxanes and other silicones, alcohols, stearates and glycols.

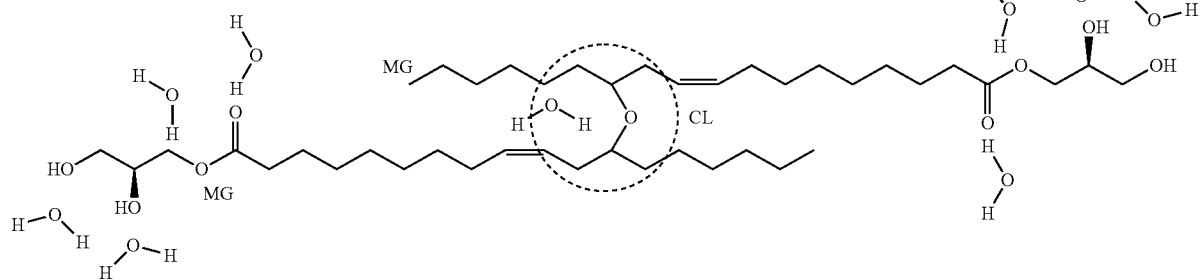

Drying/Curing process

Although the crosslinking reaction will occur naturally in the presence of oxygen, the reaction rate can be increased with the addition of a small amount of chemical drying agent. Drying promoting additives are generally mixed at the point of use preferably upstream of the road application nozzles as a co-feed stream. A static mixer downstream will mix in the crosslinking agent just before the final composition exits the spray nozzles. Drying additives can be mixed with the bulk water emulsion if they are not fast acting. Typical metals used as drying agents for fatty acids are cobalt, zinc, zirconium and manganese.

The Dura Company offers several exemplary products for water based resins that be employed as additives to promote the crosslinking reaction (drying/curing), including:

Duroct® WR Series—6% Co, 10% Co, 6% Mn, 6% Ca and 12% Zr

Duroct® Lithium WR 2% NDA—VOC free drier
Duroct® WDX Series—5% Co and 8% Mn
DriCAT® 10—Mixed Cobalt/Potassium drier
DriCAT® 506—Mixed metal blend (Co/Ba/Zr)
DriCAT® 507—Mixed metal blend (Co/Li/Zr)
DriCAT® 509—Mixed metal blend (Co/Ba/Zr)
DriCAT® 508—Cobalt free drier
DriCAT® 2705FW —Cobalt free drier
DriCAT® 2715FW —Cobalt free drier
DriCAT® 2725FW —Cobalt free drier Cobalt-Free Agents Include Zinc, Zirconium and Manganese Exemplary natural additives that can be employed in the road dust control compositions and methods described herein include, without limitation, linseed oil (promotes crosslinking), metathesized soybean oil (promotes crosslinking) thermally treated soybean oil (slightly oxidized) (a compatabilizer) lecithin (an emulsifier or surfactant), magnesium chloride (promotes water absorption, lowers freeze point), calcium chloride (promotes water absorption, lowers freeze point) and sucrose esters (which serve to expand the final cross-linked network).

Materials and methods that may be useful in making or using the biomaterial and compositions of the invention may be described in the following documents:

U.S. Pat. No. 7,108,800 Method for preventing the agglomeration or generation of dust from a particulate material comprising coal U.S. Pat. No. 6,729,805 Methods and compositions for reducing dust and erosion of earth surfaces U.S. Pat. No. 6,589,442 Dust control composition US 2013/0058718; U.S. Pat. No. 7,398,935 Methods and Composition for Dust Control and Freeze Control Noureddini et al., Glycerolysis of Fats and Methyl Esters, JOACS, Vol. 74, No. 4, 419-425 (1997).

Echeverri, Glycerolysis of Crude Methyl Esters with Crude Glycerol from Biodiesel Production, 2013, J. Am. Oil Chem. Soc. 90:1041-1047.

Noureddini et al., A Continuous Process for the Glycerolysis of Soybean Oil, JOACS, vol. 81, no. 2, 203-207 (2004).

Aggregate Roads Dust Control: A Brief Synthesis of Current Practices; Minnesota Department of Transportation Research Services, Office of Policy Analysis Research and Innovation (June 2013).

Hancock et al., Prog. Org. Coat., 1989 337-347.

Example II

Preparation of Biomaterial Derived from Biodiesel Waste and Evaluation of Dust Control Properties Overview Waste glycerol can be combined with soybean oil or soy biodiesel in a chemical process to generate high concentrations of mono- and diglycerides. The resulting bio-derived material is well-suited to application to gravel roads as a dust mitigation agent. The benefit of the mono- and diglycerides are threefold. First the presence of hydroxyl groups on the glycerol end of the glyceride allows it to be dispersed in water while the long chain fatty component compatiblizes any triglycerides present in the mixture, allowing them to be emulsified in water without the need for additional surfactants. Second, the unsaturated fatty chain(s) (from the soybean oil or the soy-based biodiesel) allow the molecules to cross-link with each other and cure into a sticky semi-solid material producing a web-like polymeric structure that binds the dust suppressant agent to the fine particles within the gravel matrix. This matrix is not water soluble and consequently won't be washed away into the ground water. Third, the hydroxyl groups on the mono- and diglycerides, are free to absorb moisture from the air making it hygroscopic and wet. The cross-linked molecules and water absorption sites are shown in Example 1. This hygroscopic mechanism is the mode of action of current road dust suppression salts such as magnesium chloride. The presence of unreacted glycerol in the biomaterial is also advantageous. Glycerol aids in that compatiblization of all the components with water. Glycerol also increases the water attracting properties of the final gravel applied material, and suppresses the freezing point of the solution. Additionally, the soy based polymeric glyceride mixture will not be corrosive like the salt based dust suppressants currently in use today. Finally, the ester bonds present in the fatty acid structure make it biodegradable so that it does not accumulate in the environment over time.

The ability of the bio-derived material of the invention to be dispersed in water is especially important for the application industry because the biomaterial can be applied with existing equipment that is used to apply chloride based brine solutions to road beds. Advantageously, the biomaterial of the invention is a "drop-in" replacement for magnesium and calcium chloride brines but without their corrosive properties. Chlorides work through deliquescence by sequestering moisture from the air thereby making the gravel damp and dust free. The biomaterial of the invention also has this quality due to the presence of hydroxyl groups on the mono- and diglycerides.

Vegetable oil soapstock, a by-product from the edible oil purification process, is used as a dust control agent and also contains triglyceride oils. This material works by coating the dust particles with oil and agglomerating them into a stable amalgam. However, soapstock is not dispersible in water and must be heated to above 35° C. and applied on warm days followed by a waiting period of 6-8 hours for it to penetrate the gravel. It is often covered with sand in order to allow vehicle traffic the same day it is applied to avoid excessive vehicle splatter. The biomaterial of the invention possesses the oily agglomeration aspect of the soapstock, but since it is dispersed in water, it penetrates the gravel faster and can be applied without heating.

Experimental Work

Biodiesel was first synthesized in the lab from soybean oil. Twenty batches of biodiesel (10 kg each) were synthesized in 10-liter glass reactors in order to provide an ample supply of waste glycerol and crude biodiesel for use throughout the project. The biodiesel and crude glycerol were separated from each other and used as-is without further washing or purification. This was done to ensure a consistent and reliable supply of these starting materials.

A generalized chemical reaction scheme to make glycerides from glycerol and biodiesel is shown below. The reaction vessel was fitted with a sampling port that allowed for periodic sampling of the reactants (every 30 minutes) in order to optimize the reaction time within a single batch. This approach resulted in a mixture of mono, di and triglycerides with some residual glycerol. Methanol was stripped off in order to drive the reaction forward.

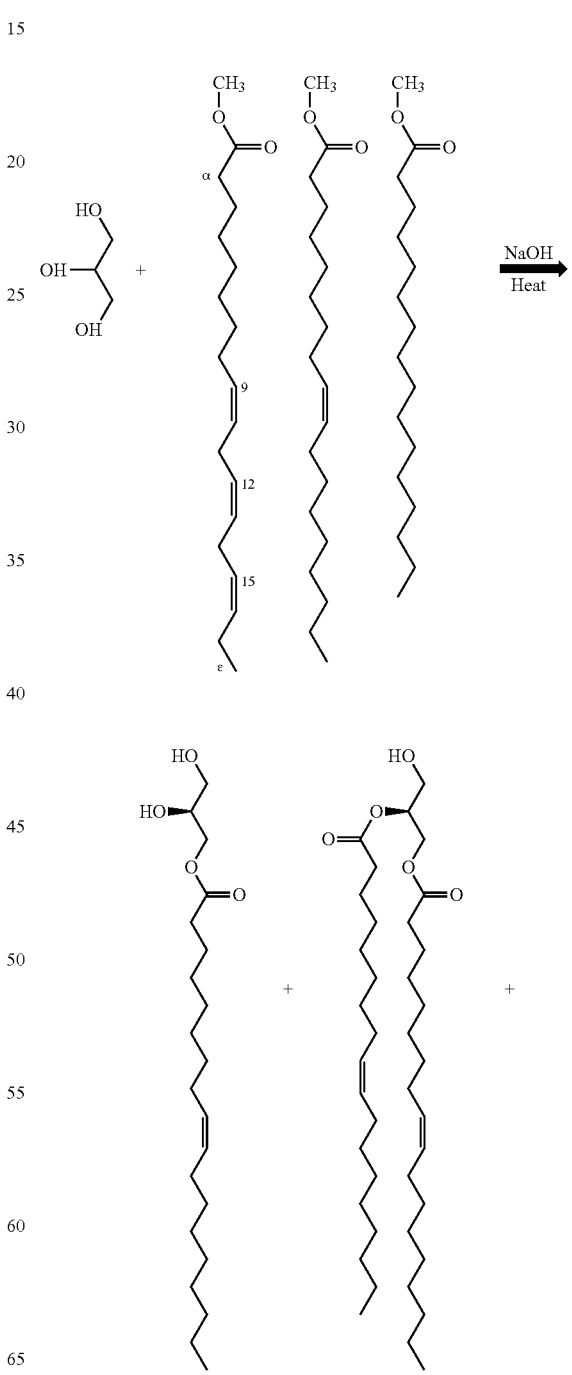

-continued

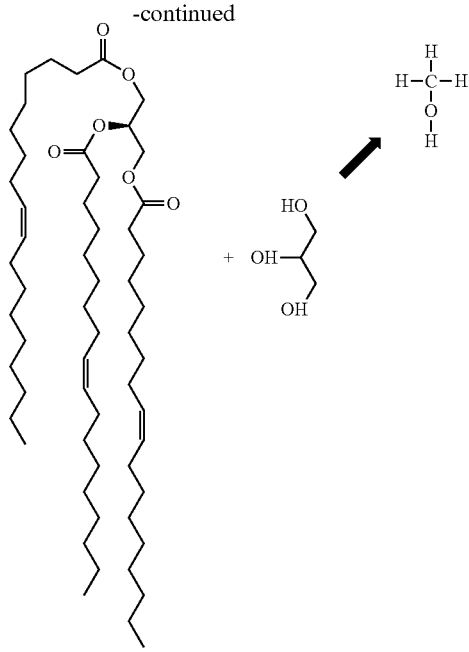

We also developed a high performance liquid chromatography (HPLC) method that permitted analysis of the samples and determine the relative amounts of mono, di and triglycerides present in each sample. The amount of glycerol present could not be analyzed with the HPLC, so the data from the HPLC was combined with mass balance calculations in order to determine glycerol concentration in the samples.

After a few months of laboratory synthesis, a set of reaction conditions was identified that yielded a favorable combination of high glycerol usage, short reaction time, and high percentage of mono- and diglycerides in the final product. Several more batches where synthesized using these reaction conditions in order to generate enough material to perform the gravel treatments and testing.

The next step in the research was to generate water emulsions from this material. Several water emulsions of various concentrations where made and allowed to stand for several days to monitor their stability and viscosity. No additional surfactants or emulsifiers were needed for this step. The wetting characteristics of the gravel with the emulsions were studied as well as the drying characteristics of the emulsions in air on flat surfaces.

Class 5 gravel was purchased from a local landscaping company and was sieved to remove the rocks larger than 0.5 inch. This was done in order to minimize the error associated with performing tests that are weight based on a relatively small scale. For example, a few large rocks can make up most of a small sample but have very little surface area related to an equal amount of dust forming fines. Some of the class 5 gravel was further sieved to remove particles greater than 2.4 mm to further reduce error from sample to sample.

Restaurant style sheet pans and holding rack were purchased to facilitate the drying and storage of the treated class 5 gravel. Ten pounds of gravel was placed on each tray and treated with a set amount of dust control agent and then allowed to dry in the lab prior to testing. Both soy based dust control agents and magnesium chloride agents were used to treat the gravel trays.

A small concrete mixer (3 cubic feet) was purchased from Northern Tool & Supply and modified in-house for use as a dust generation/collection apparatus. The modifications involved the creation of a sealed lid outfitted with a receptacle for mounting bag type filter elements as well as a swivel joint for the introduction of a known amount of air (0.4 scfm) while it was rotated. The internal baffles were replaced with smooth plastic baffles that ensured the loaded gravel would experience a free fall with every turn of the drum. These modifications allowed for sufficient agitation of the gravel so that free dust would be generated and swept out of the drum for collection onto the filter bag (1 micron rating). The filter bag was weighed before and after the 5-minute test to quantify the amount of dust present. The workflow is depicted in FIG. 1.

The modified concrete mixer worked well to characterize the various dust control treatments but collected a wide range of dust particle sizes and did not discriminate by size. In an effort to better understand the level of the very fine dust that is especially damaging to human health, we utilized a hand held aerosol meter (DustTrak II from TSI) that was able to give the mass concentration of respirable dust particles of less than 4 microns in size.

In order to verify the assumption that our cross-linked dust control agent does not wash away in the rain, we performed testing on several samples of treated gravel and compared them to magnesium chloride treated gravel. This test involved the combination of 200 grams of finally sieved treated gravel with 300 ml of distilled water. The mixture was gently mixed for 5 minutes and allowed to stand overnight. The mixture was then filtered and the washed gravel was dried completely overnight. The mass difference from the prewashed, treated gravel to the post washed and dried gravel indicated the amount of treatment that was removed by the water. This test was performed in order to simulate the effect of rain water leaching of a dust control agent from a road bed.

Unsaturated vegetable and seed oils are known for their drying characteristics through the crosslinking of the unsaturated double bonds present in the fatty acid chains (i.e. linseed oil wood finish). To investigate the occurrence of crosslinking within the treated gravel, samples of the treated gravel were washed with tetrahydrofuran (THF) solvent for 4 hours. The THF was then filtered and dried to isolate any cross-linked (and non cross-linked) material that was extracted from the treated gravel. These samples were then prepared for analysis by Gel Permeation Chromatography (GPC) to determine if any higher molecular weight molecules had formed due to the crosslinking mechanism described above. Samples of treated and aged gravel with and without drying promoters as well as an unaged sample where analyzed.

Findings

Two approaches to the synthesis of a soy based product with high concentrations of mono- and diglycerides were explored. The first involved the use of soybean oil and glycerol and proved to be more difficult with longer reaction times and high temperatures. The final composition also had higher levels of triglycerides than was desired. The second synthesis approach involved the use of crude, soy-based biodiesel and crude glycerol without additional catalyst. This approach gave favorable results with reasonable temperatures (150° C.) and reaction times of around an hour. This approach required that the methanol formed during the reaction be stripped off either by vacuum and/or a sweep gas of nitrogen to drive the reaction forward.

Figure 2:
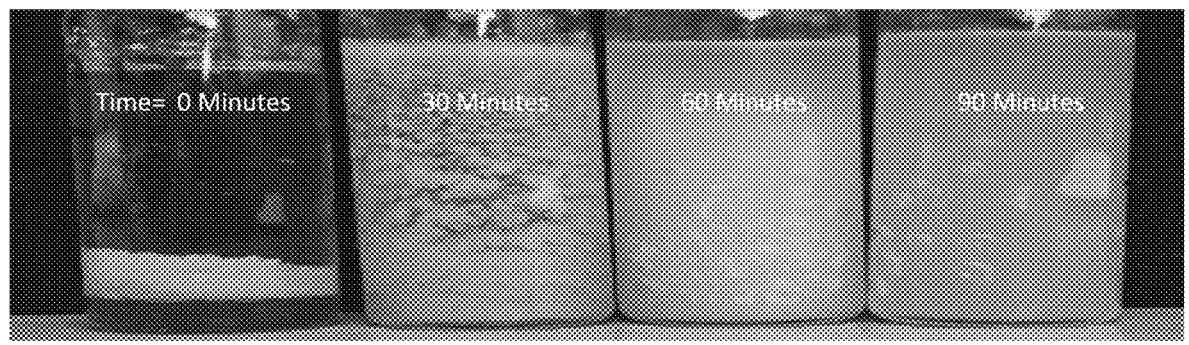
FIG. 2 depicts conversion of glycerol and biodiesel into glycerides as a function of reaction time. Samples were taken at time 0 min, 30 min, 60 min and 90 min and analyzed for biodiesel (BD), soy bean oil triglyceride (SBO), diglyceride (DG) and monoglyceride (MG) content by HPLC. The photo above the graph depicts the corresponding time samples after they cooled down. MG and DG appear as the white cloudiness in the vials. The 60-minute sample was selected for further investigation.
Figure 2:
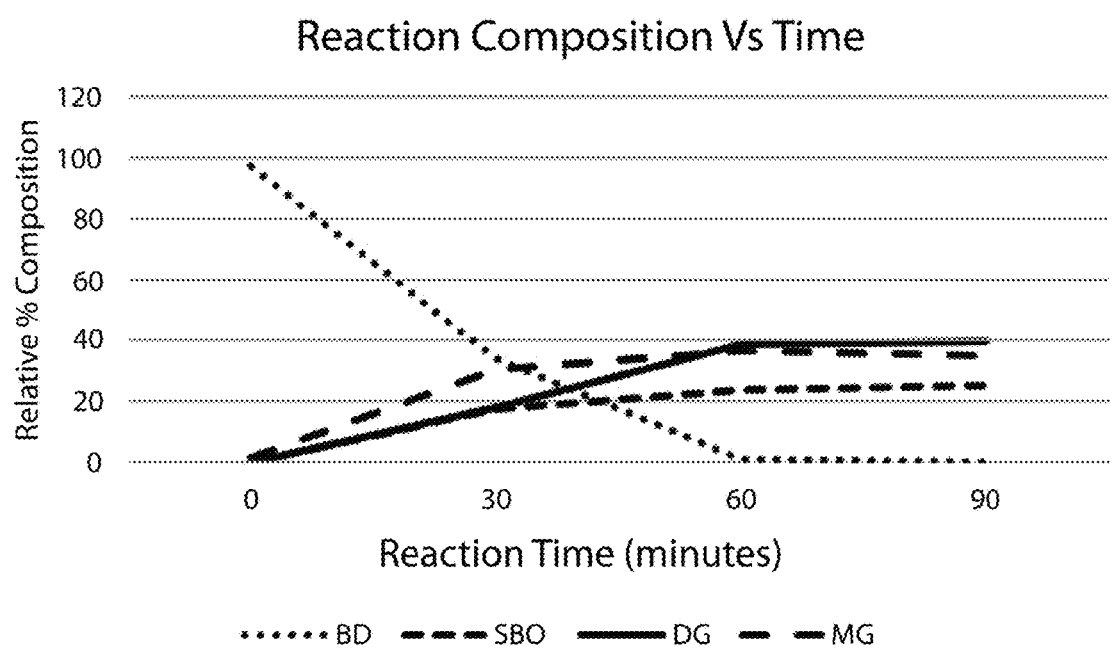

Several synthesis reactions were performed while samples were taken every 30 minutes for analysis. The data from these tests showed that the maximum levels of mono- and diglycerides were achieved at around 1 hour. At this time, 100% of the starting biodiesel was consumed and running the reaction longer resulted in the increased formation of triglycerides and decreased formation of monoglycerides which is undesirable for good water dispersion. A photograph of the 30 minute samples as well as their relative concentrations of biodiesel, mono, di and triglycerides is shown in FIG. 2. The white precipitate visible in the sample photos is made up of the mono- and diglycerides.

The catalyst used for these reactions was sodium hydroxide. It appeared that the residual amount of sodium hydroxide catalyst left over from the biodiesel synthesis was sufficient enough to catalyze the reaction. Crude biodiesel and crude glycerol were used to ensure that the catalyst was not washed out by prior purification of these materials. Some synthesis reactions were performed where additional catalyst was added, but the final product distribution did not change significantly and the resulting material became more difficult to emulsify in water as it had a gel like consistency. Also, the final water emulsions were highly basic compared to the materials made without additional catalyst which were more neutral (pH~7.5).

Figure 3:
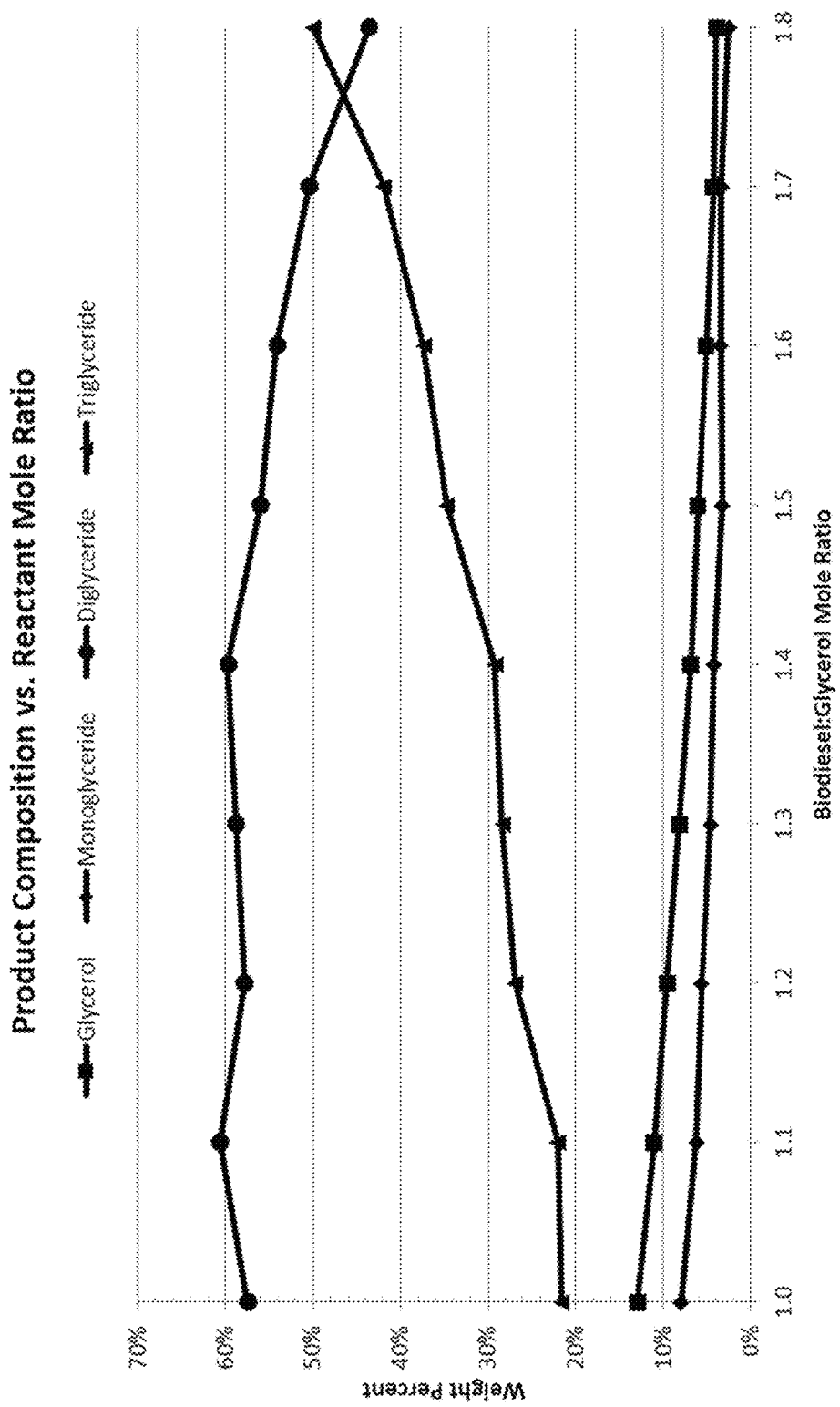
FIG. 3 depicts final product composition as the ratio of biodiesel to glycerol was increased. These samples were taken at 60 minutes after the start of the reaction from each batch and analyzed by HPLC. The molar ratio of 1.2 parts biodiesel to 1 part glycerol was selected for further investigation.

With the basic reaction conditions now optimized, we then used these conditions as our standard reaction scheme and focused on the effect of biodiesel to glycerol ratio on the final product distribution. The experimental design for this round of testing started with a biodiesel to glycerol molar ratio of 1:1 and ended at 1.8:1 with biodiesel increments of 0.1. The results of these experiments are shown in FIG. 3 and indicate that as the starting concentration of biodiesel is increased, the final concentration of triglyceride also increases. This is consistent with the observation that the reaction favors the formation of triglyceride if given enough time. Essentially, if a biodiesel to glycerol ratio of 3:1 is utilized, then after enough time only triglyceride would remain. The goal was to limit the reaction to form only the intermediate compounds of mono- and diglyceride before they were fully converted to the triglyceride. This was attempted by "starving" the reaction with insufficient amounts of biodiesel from the start and stopping the reaction before all the biodiesel was converted to the triglyceride. In reality, it was discovered that the reaction kinetics are such that mono-, di- and triglyceride formation overlap with each other and the final composition is a mixture of mono, di, and triglyceride with some remaining glycerol. The biodiesel is completely consumed however.

It should be noted that the presence of all three glycerides in a single reaction mixture yielded unanticipated benefits, as detailed elsewhere herein, since each glyceride contributes one or more features such as hydrophilicity, hydrophobicity, and cross-linking potential that collectively and synergistically enhance the suitability of the mixture for dust control purposes.

Based on these results the ratio of 1.2:1 biodiesel to glycerol was chosen as the optimal starting concentration for this application due to the relatively high levels of mono and diglycerides as well as the high level of starting glycerol utilized. A high level of glycerol is desirable since it is very inexpensive and as such, we wanted to maximize its use. This ratio also gave a final product distribution that was easy to emulsify with water. This starting ratio of 1.2:1 biodiesel to glycerol along with the optimized reaction condition of 1 hr at 150 C became the standard for the remaining work and several batches where then synthesized for the treatment and testing of class 5 gravel.

Figure 4:
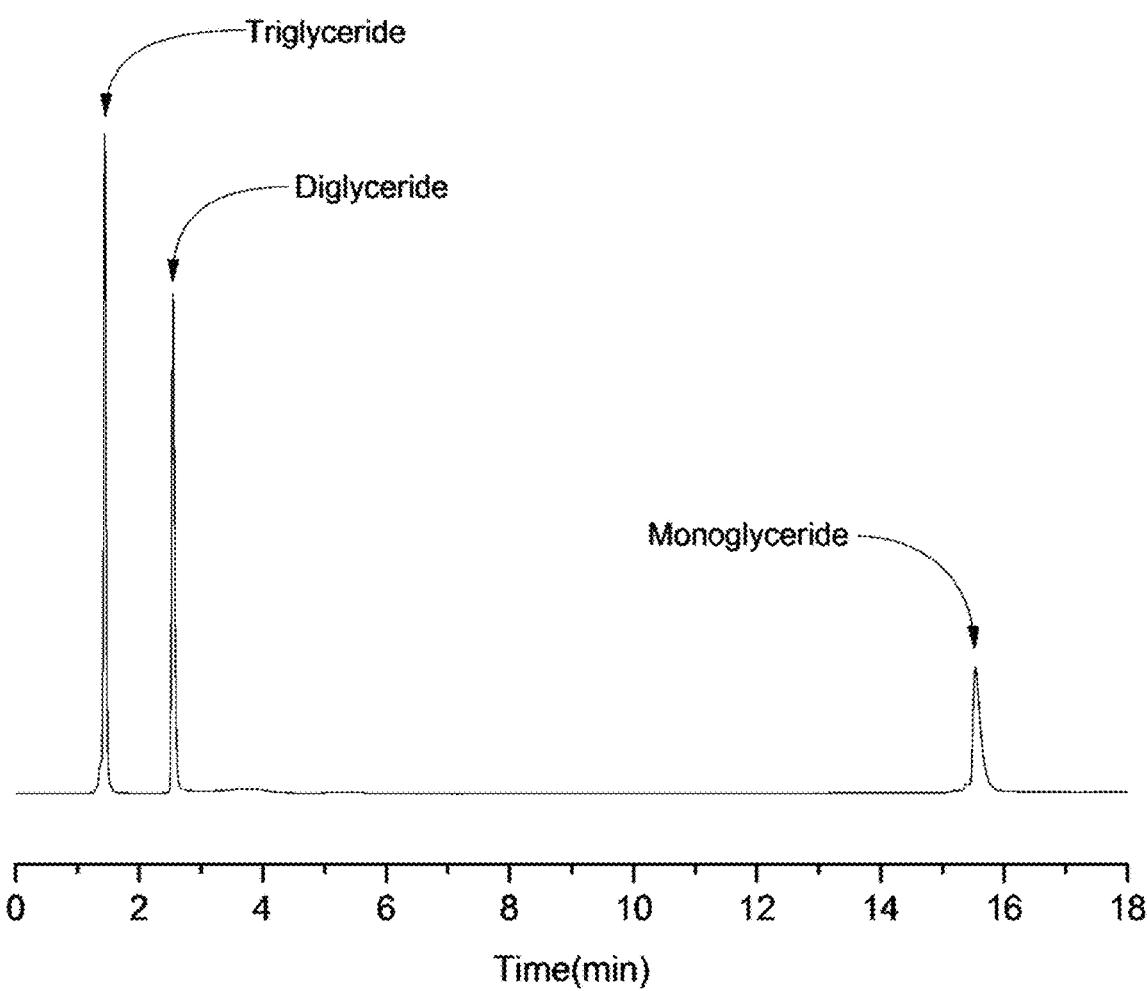
FIG. 4 shows an HPLC chromatogram from the selected sample (1.2:1 biodiesel to glycerol) showing the three major components of the soy based dust control agent with minimal impurities. Glycerol concentration was determined offline using mass balance calculations.

The detection of triglyceride, diglyceride and monoglyceride for each sample was determined after separation on an Agilent/HP 1100 series HPLC using an evaporative light scattering detector. Identification of compounds in each chromatogram was determined by comparison to individual standards. Calibration curves, the relationship between peak area and concentration, for triglyceride and monoglyceride standards were produced using three concentrations (mg/mL) for each compound. Concentrations of tri and monoglycerides for each sample were derived from the calibration curves and that of diglyceride and glycerol were extrapolated by mass balance and initial reactant mole ratio equations. A chromatogram for the starting ratio of 1.2:1 biodiesel to glycerol (our standard material) is shown in FIG. 4. The chromatogram shows good separation of the products and little if any by-product formation.

Drying/Curing Study

Water emulsions of the 1.2:1 product were made by adding the warmed material to water in a hi shear mixer running at 10,000 rpm. The maximum concentration of product dispersible in the water was 25 weight %. Higher concentrations produced emulsions of high viscosity that were still liquid but deemed too "thick" to be applied to a road bed with standard application equipment. Trays containing 10 lbs. of class 5 gravel were treated with the emulsified material at various concentrations relative to the standard application of magnesium chloride of 0.3 gal/yd$^2$. A portion of the emulsion was also applied directly to a clean tray containing no gravel and allowed to dry in the open air. Manganese was also added to some of the emulsions as a drying promoter.

Once applied to the gravel the emulsion was allowed to soak in for 10 minutes then mixed by hand to achieve a uniform coating. Three samples were then mixed with THF solvent in order to extract the organic soy based dust control agent from the inorganic gravel in order to determine if any measurable amount of crosslinking had occurred. The three samples included treated gravel that had aged 2 months, the same treatment aged 2 months on a clean tray and treated gravel that had aged 2 days. The extracted THF was filtered, purified and analyzed by GPC to determine the average molecular weight of the extracted material. The GPC results for the three samples are shown in Table 1 below.

TABLE 1

Molecular weight (Mw) of cross-linked dust control agent extracted from soil

| Material | Average Mw (gr/mol) |
| --- | --- |
| Treated Gravel - Aged 2 Months | 1,974 |
| Treated Gravel - Aged 2 Days | 870 |
| Same Treatment Aged 2 Months in a Dish | 6,981 |

Figure 5:
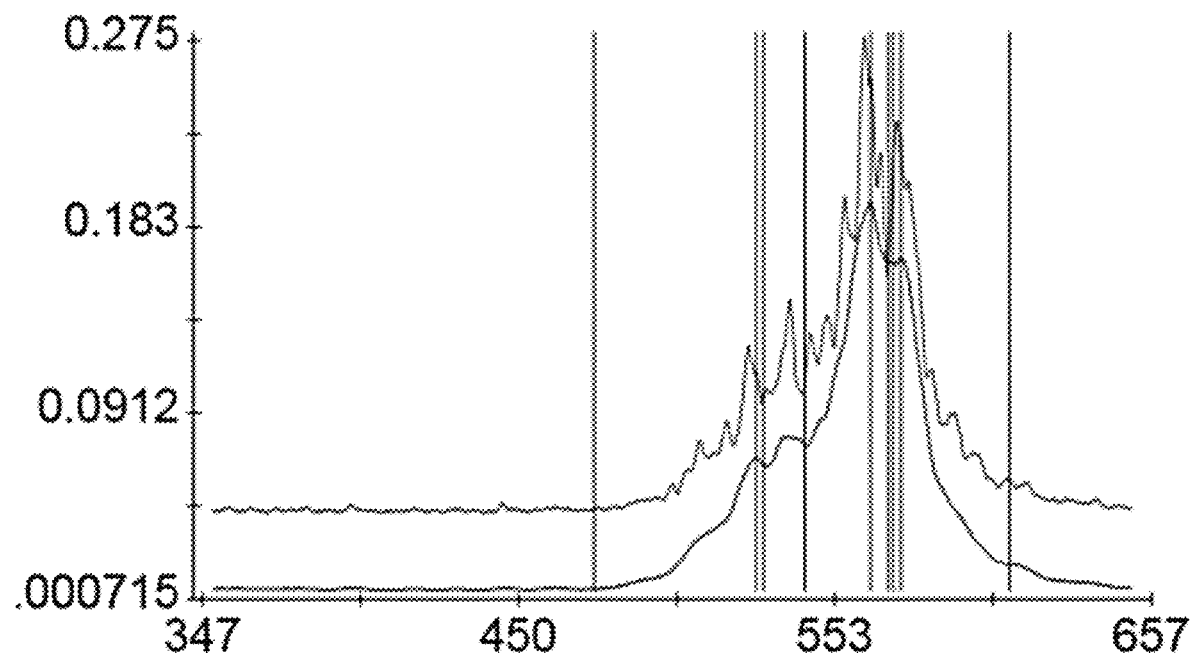
FIG. 5 shows a gel permeation chromatograph (GPC) result from tray cured soy-based dust control agent. The broad range of molecular weights (>8,000 grams/mol) indicates that there is crosslinking of the fatty acid chains during curing resulting in a sticky semi-solid material that assists with fines retention of the road gravel. The raw data and the smoothed data are both shown.

The results indicate that there was a significant level of crosslinking in the air dried non-gravel sample. The actual levels are likely to be higher than this, but the THF was unable to extract the very highly cross-linked material present in the sample. This was evident in the liquid samples by the presence of a solid precipitate that was removed by the filtering of the sample prior to GPC measurement. The same treatment extracted from the 2-month old gravel sample also showed crosslinking (increased molecular weight compared to the unaged sample) but it was not easily removed from the gravel and was likely caught on the filter along with the fine particles of gravel. The material extracted from the 2-day old treated gravel did not show an increase in molecular weight and was essentially the molecular weight of the mono, di, and triglycerides. These test results indicated qualitatively that the material does form crosslinks with itself over time resulting in the formation of a high molecular weight structure. This is also evident from the visual inspection of the air dried material that was applied to the clean tray as it had formed a sticky, viscous semisolid material over the 2-month period. A GPC chromatogram from the tray dried material is shown in FIG. 5. The broad, multi-peaked data indicates that there is a mixture of molecular weight material present in the soil extract.

Rain Water Leaching Study

Figure 6:
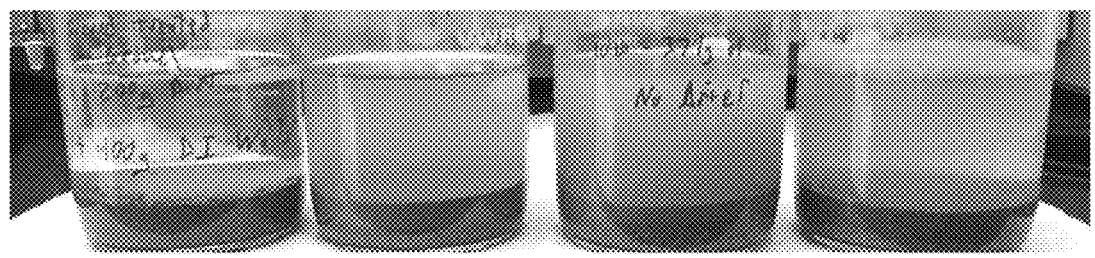
FIG. 6 shows treated gravel samples after washing with water (simulated rain) after settlement. From left to right the samples are as follows: soy-treated-aged 2 months; soy treated-aged 2 days; magnesium chloride treated; untreated. The sample on the far left settled quickly indicating that the soy based dust control agent, once cured, bound the fine dust particles into larger agglomerations that settled out faster. Gravel was sieved to remove particles larger than 2.4 mm prior to testing.

A portion of the treated gravel used for the drying study was washed with DI water to simulate the effects of rain water. The goal was to determine if the soy based material would be washed away by the rain as compared to gravel treated with magnesium chloride. Gravel samples were first sieved to remove particles larger than 2.4 mm and then washed with water and allowed to settle overnight. The settled samples prior to filtering are shown in FIG. 6. From the picture it is apparent that the treatment on the gravel aged 2 months has bound the fine particles together because the particles settle out much faster than the untreated control and unaged samples. The clarity of the water in the first sample shows that the treatment prevented the "loss of fines" exhibited by the other samples. The water was then filtered off and the gravel dried. The mass of the gravel before and after the water wash was used to determine how much of the treatment was removed by the water. The filtered gravel was not further washed with water.

The results from the simulated rain leaching study are shown in Table 2 below. As expected, the soy based material was not significantly removed by the exposure to water due to the fact that it is not water soluble. The small amount of mass lost from the 2-month old sample may be due to the mechanism of biodegradation which will cleave the glycerol from the glyceride molecules. The glycerol is water soluble and can be removed by water. The fact that only 3% mass loss occurred over a 2-month period is promising since the treatment needs to last the entire summer and fall. The magnesium chloride sample lost over 70% of its initial treatment in just one water exposure.

TABLE 2

Amount of dust control agent removed from treated gravel (soy based and magnesium chloride) by washing with water.

| Material (200 gr Sieved Class 5 Gravel) | Weight Loss After Washing | Treatment Loss % |
|---|---|---|
| Soy Treated - Aged 2 Months | 0.1 gram | 3.03 |
| Soy Treated - Aged 2 Days | <0.1 gram | 1.21 |
| Magnesium Chloride Treated | 6.94 gram | 71.82 |
| Untreated Gravel* | 0.3 gram | N/A |

*0.3 grams lost as fines passing through the filter

Measurement of Dust Control Properties

Figure 7:
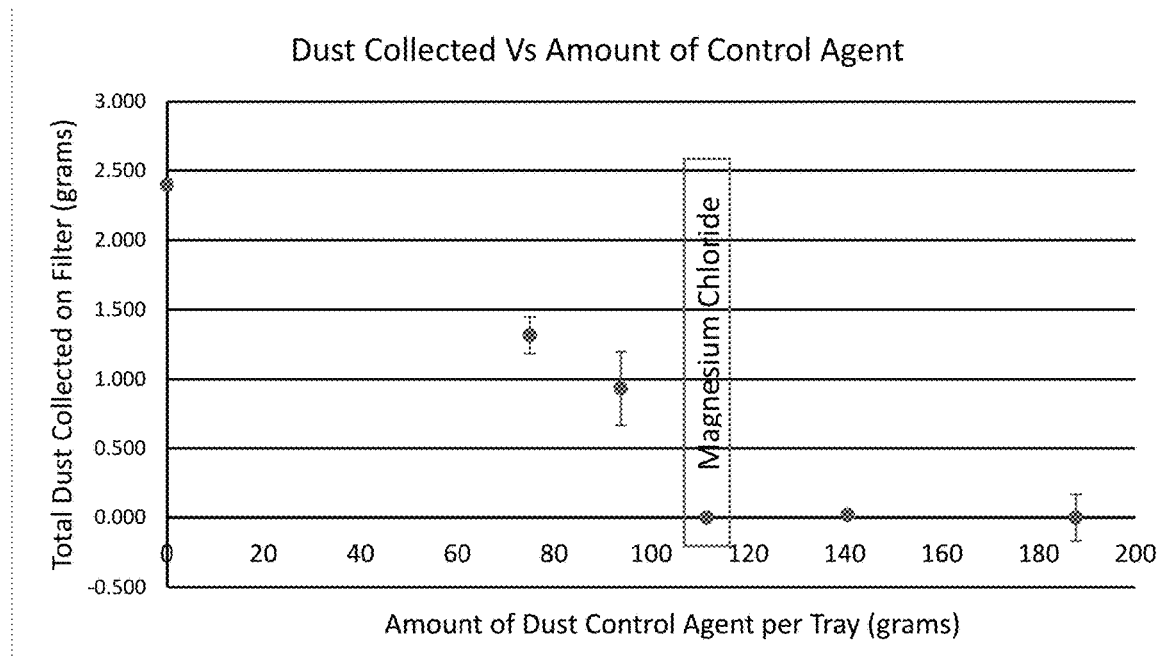
FIG. 7 shows total dust collected from treated and untreated gravel samples as a function of treatment amount. 1.5 lbs. of gravel samples were tumbled in the sealed concrete mixer for 5 minutes while an air stream was introduced at 0.4 scfm. The "dusty" air escaped the mixer through a 1-micron filter bag which collected the entrained dust for weight measurements. Gravel samples were exposed to 58% relative humidity (R.H.) and 72° F. prior to testing.

The modified concrete mixer was used to measure the dust retention properties of the treated gravel as a function of treatment level. The goal of this test was to determine the appropriate application rate of the soy based materials relative to the magnesium chloride treated sample. Four different levels of soy based treatment were tested against one standard treated with magnesium chloride. An untreated gravel sample was measured as a control for comparison as well. The results of these tests are shown in FIG. 7. All the samples were tested the same day under the same conditions of temperature and humidity for consistency. The relative humidity was actually quite high the day of the test at 58% and the magnesium chloride sample was visibly damp. As a result, the magnesium chloride treated sample performed quite well. The results indicated that the soy based dust control agent can perform as well as the magnesium chloride, even on a humid day when magnesium chloride is at its best. The treatment level for the soy based material required to achieve the same level of dust control was around 140 grams per tray compared to the 111 grams per tray for the magnesium chloride.

Figure 8:
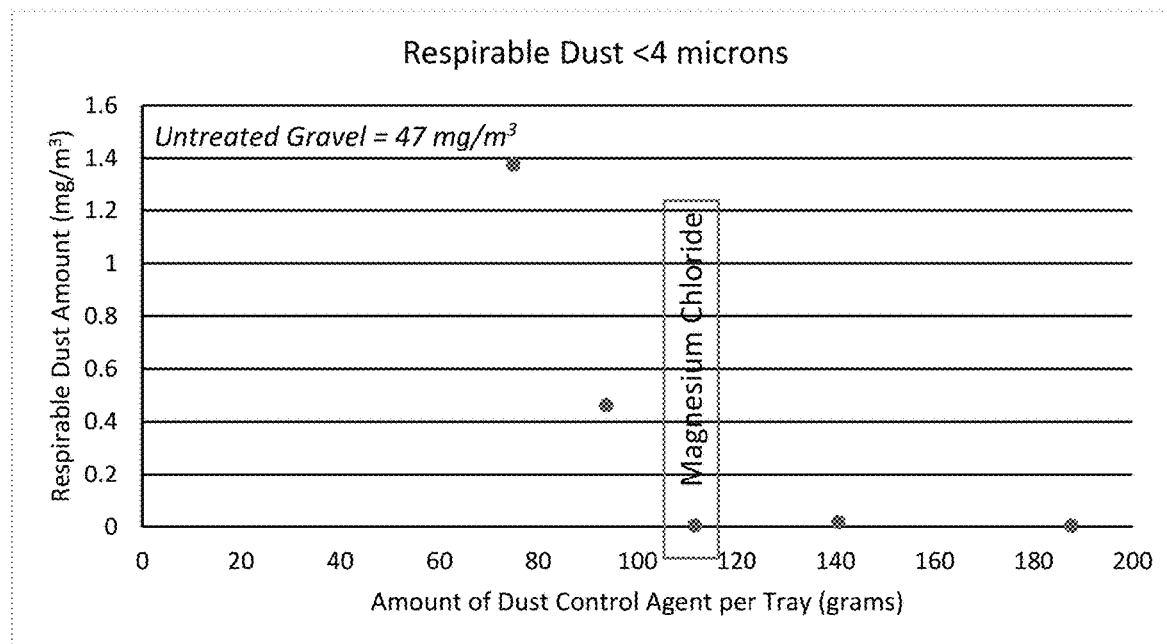
FIG. 8 shows respirable dust levels as a function of gravel treatment amount. Measurements were taken with the Dust-Trak II™ Photometer at the end of each 5 minute tumble in the modified concrete mixer. Gravel samples were acclimated to 58% R.H. and 72° F. prior to testing.

The modified concrete mixer test method gave an indication of the total dust generated, but did not differentiate by particle size. In order to measure the amount of respirable dust (particles smaller than 4 microns) generated during the testing we used a handheld aerosol monitor to sample the dust cloud created inside the concrete mixer at the end of 5-minute tumble. The results shown in FIG. 8 are in mg/m$^3$ of air and correspond well to the filter bag mass measurement method. This data indicated that the same treatment level of 140 grams per tray was sufficient to bind the very small particles as well. This equates to a road application rate of 0.45 gal/yd$^2$ which is more than the 0.3 gal/yd$^2$ typically used for magnesium chloride brines, but 50% less than the equivalent amount of soapstock that is typically applied (for an equal mass of treatment not including the water).

Figure 9:
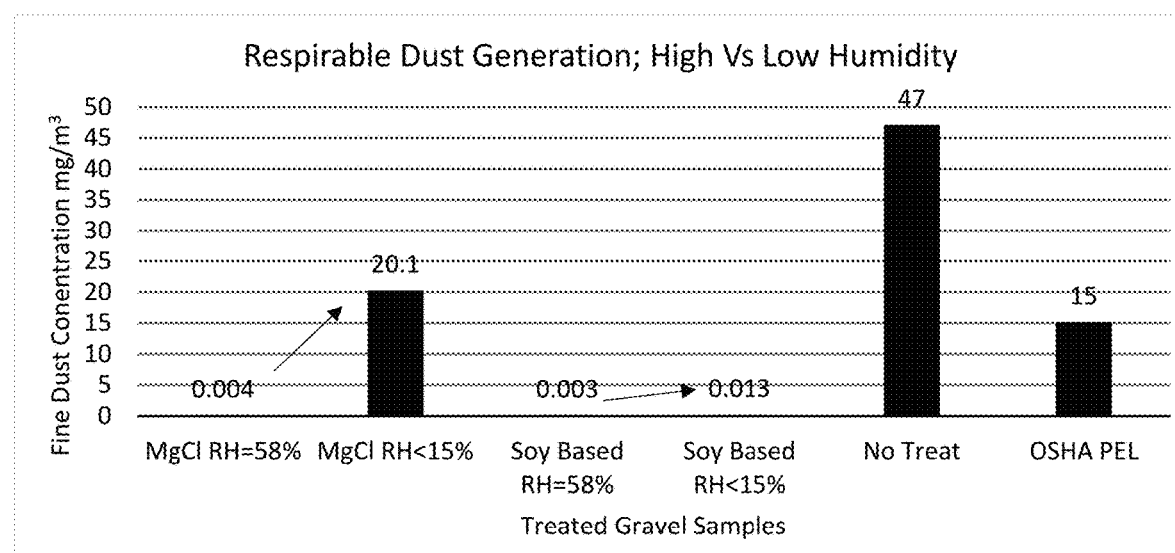
FIG. 9 shows the effect of low relative humidity on dust suppression ability. Data from the magnesium chloride and the soy based treatment (140 g/tray) are shown above. Non-treated gravel and the OSHA exposure limit are shown for reference.

In order to understand the effect of low humidity on the performance of the dust control treatments, treated samples of gravel were dried in an oven for two days prior to testing in the modified concrete mixer. Magnesium chloride and the soy based treatments representing the best performing samples from the previous testing group were tested under dry conditions and compared to the high humidity data based on the fine dust generation. The results of these test are shown in FIG. 9. Essentially, there was little change in the soy based dust control agent when the treated gravel was dried. It still possessed an oily appearance even though it is dry to the touch and was still able to wet and bind the dust particles. However, the magnesium chloride treated material no longer appeared to be wet and had much higher dust generation when tested under dry conditions.

Conclusions

The soy based dust control agent performed as well (or better) than other common dust control agents. Lab testing has shown that this soy-based material can be dispersed in water and applied to gravel surfaces using standard application equipment at rates comparable to brines and soapstock, it is also noncorrosive, biodegradable and performs well in dry conditions. Furthermore, this material was shown to be water stable and resists being washed away in the rain. Finally, lab results indicate that it forms cross-linked networks that bind the dust particles to both minimize fugitive road dust and reduce the loss of fines from the gravel. The latter of which will reduce road maintenance costs associated with periodic re-gravelling and grading operations.

Example III

Field Test Results and Use of Biomaterial as an Asphalt Rejuvenator and as a Recycled Asphalt Binder/Rejuvenator Synthesis of the bio-derived dust control agent was scaled up in order to provide a sufficient amount of material for a field test. The biomaterial was applied to a 600 ft.×30 ft. wide section of country road. The road surface was recently covered with a mix of gravel and reclaimed asphalt pavement (RAP). This roadbed is very hard in some places and consists of loose surface gravel in others. The hard pack areas prevent good penetration of the biomaterial and the loose gravel areas tend to washboard since there are no fines to hold the loose gravel in place. This mix of gravel road composition, although not ideal, offers a variety of surface conditions in one test area. The sections of the road that have a good mix of fine, medium and course gravel appear to absorb the soy based material very well and forms a hard-packed stable surface.

Figure 10:
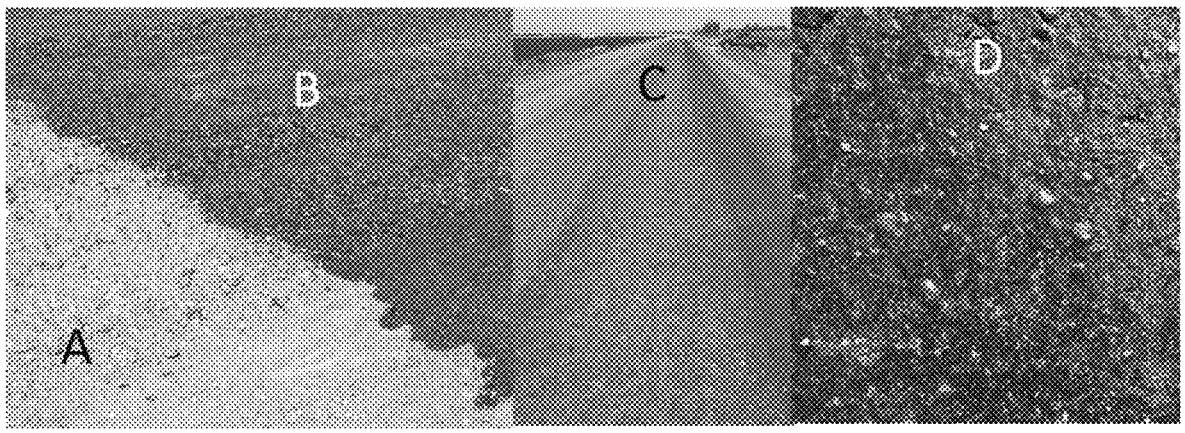
FIG. 10 shows treatment of recycled asphalt (RAP) roads with the dust suppressant biomaterial at the various stages: panel A shows dry untreated gravel/RAP road surface containing loose surface gravel, panel B shows gravel road surface immediately after treatment with the water based emulsion, panel C shows gravel road surface after 6 weeks with asphalt-like surface, and panel D shows a close up of rejuvenated RAP/gravel road surface 2 weeks after application.

During field testing of the biomaterial, an unexpected interaction occurred between the biomaterial and the recycled asphalt pavement (RAP) material that was mixed into the gravel road surface. It was observed that the biobased dust control agent, comprising mono, di and triglycerides in an aqueous emulsion, soaked into the RAP and created an asphalt-like road surface. The glyceride mix formed a solid solution with the RAP causing it to swell, soften and migrate to the surface of the gravel roadbed. This resulted in a firm, compact, black and water stable road surface that is resistant to vehicle traffic, stabilizing the loose gravel present in the original roadbed as the biomaterial acted as a binder for the loose RAP. Pictures of the road surface throughout the process are shown in FIG. 10.

What was originally a dry, loose gravel road not only became dust free after the application of the bio-based dust control agent, but the RAP material used in its construction was bound together forming a stable road surface. This road surface behaves like an asphalt road surface but only required the spreading of loose RAP material on the original road bed followed by the spray application of the bio-based dust control agent to construct. The biomaterial seems able to serve as a base stabilizer if applied to a well-blended gravel road base. Additionally, after 6 weeks, there was no visible dust from vehicle traffic on the test section. It appears that this approach to gravel road construction can result in a very stable "asphalt-like" road surface that is easy to apply and utilizes reclaimed asphalt combined with the bio-based dust control agent.

Experimental

Synthesis of Large Quantities of Soy Based Dust Control Agent (>100 Gallons of Concentrate) at Pilot Plant Over the course of 4 months, we synthesized 275 gallons of concentrate using our dual 10 liter reactors. Over 150 individual batches were made on an ongoing basis. The concentrate was emulsified in water to obtain the final product that would eventually be applied to the gravel road, using an in-house emulsifier system. The system we designed consisted of a jet pump that recirculated the warm water contained in the 275 gallon IBC tote tank through a set of static mixers at 10 gpm under 100 psi of pressure. The concentrate was then heated to 50 C with a pair of drum heaters and fed into the recirculated water stream just upstream of the jet pump. The design of the jet pump created a very high shear environment that easily broke down the concentrate into small particles of less than 10 microns that were stable in water. It took about 1 hour to feed the entire 55 gallon drum of concentrate into the water circulation circuit and an additional 4 hours of recirculating the emulsion through the static mixers to obtain a stable emulsion. Overall, the in house emulsification system worked very well (better than the lab scale unit) and was used on the remaining tanks without difficultly. An additional IBC mixer was purchased in order to periodically mix the 275 gallon tanks to ensure that the emulsion would stay well mixed. The ratio of concentrate to water in the emulsion was 1:3. Although, the concentrate emulsified easily, the amount of foam generated was undesirable. We experimented with a few different defoaming agents designed to prevent this from occurring. Finally, a commercially available PDMS defoaming agent was obtained that prevented the foam from occurring during the mixing and pumping of the material. The final product has the appearance of whole milk and was stored in four large IBC's until transfer to the spray application tanker.

Test Section of Gravel Road

We applied the biomaterial to a section of the selected road over an area of 600×30 ft. This is a challenging section of the road since vehicle traffic is accelerating and braking as the vehicles enter and exit the road. In addition, there is a fair amount of heavy truck traffic on this road. The surface of this road was recently covered with a mix of gravel and reclaimed asphalt pavement (RAP). This roadbed is very hard in some places and consists of loose surface gravel in others. The hard pack areas prevent good penetration of our material and the loose gravel areas tend to washboard since there are no fines to hold the loose gravel in place. This mix of gravel road composition offers a variety of surface conditions in one test area that show how the material performs under challenging conditions. We expect that the loose gravel will migrate, but we can still measure the dust generation from these areas. The sections of the road that have a good mix of fine, medium and course gravel appear to absorb the soy based material very well and forms a hard-packed stable surface. It appears, at least initially, that our material can serve as a base stabilizer if applied to a well-blended gravel road base.

Utilize Existing Spay Application Technologies for Gravel Road Application

The application of our soy based dust control agent was performed by a local dust control company using standard equipment. One goal of this research was to create a product that could be used as a drop-in replacement for chloride brines in order to make the product easy to apply by any application company without the need for specialized equipment or the need to modify existing equipment. This approach will allow the product to be accessible to any dust control contractor or agency that has brine application equipment thereby increasing the likelihood of widespread acceptance.

Typically, the roadbed is pre-wetted with water before applying brines as the brine tends to bead up on dry gravel and run off into the ditch before the brine has time to penetrate the surface. We tested the road bed in small areas to determine if the soy based product required the same water pre-treatment prior to application and it was found that the soy based product did not need the road bed to be pre-wetted. In fact, the soy based product seemed to wet better with more penetration into the gravel surface when the roadbed was dry. This characteristic is advantageous to the use of the soy-based product over that of brines as the extra cost of pre-wetting the roadbed is eliminated. The only preparation work required for our application was to blade the road to restore the proper shape and crown required for proper rain drainage.

Figure 11:
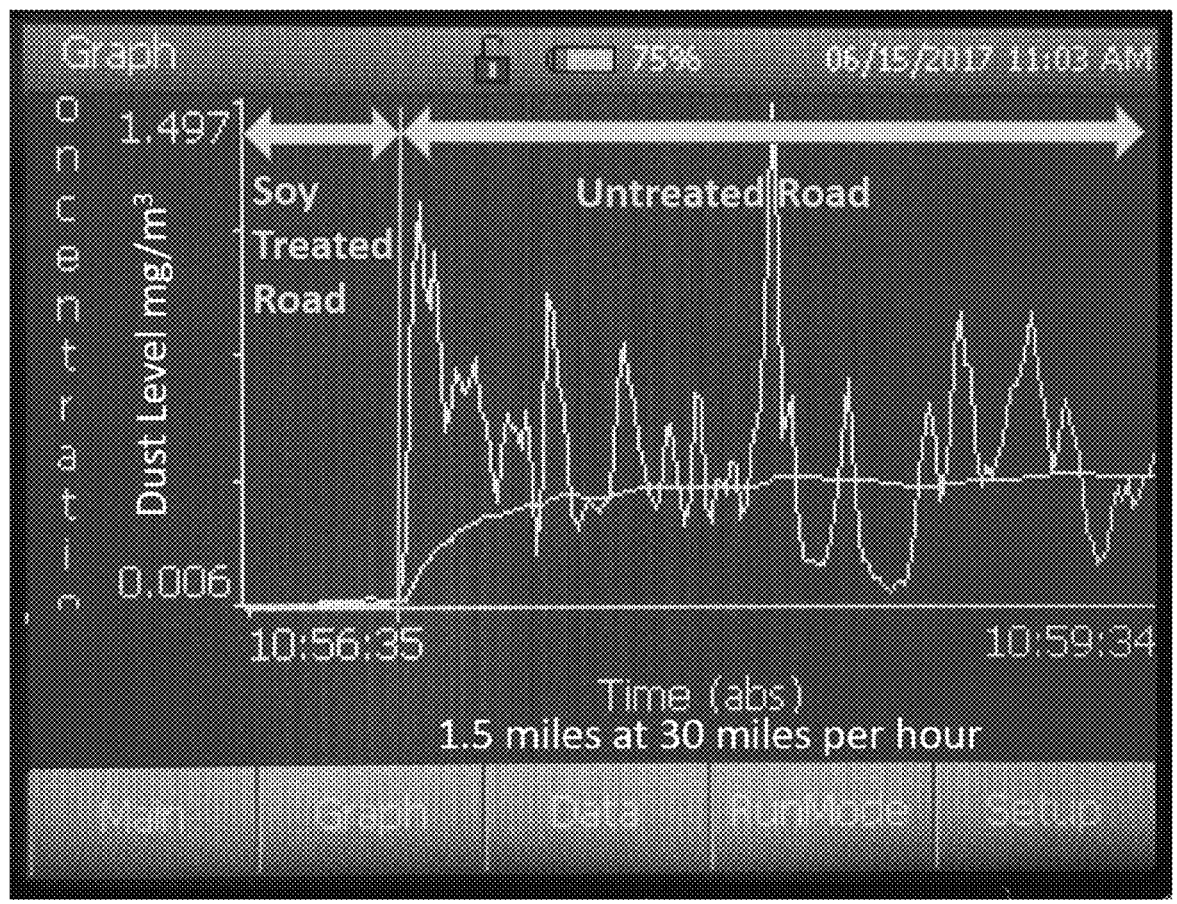
FIG. 11 shows vehicle generated dust measurement taken with the DustTrack II™ monitor. The vehicle was driven over the soy treated section first followed by an untreated section of road. No discernable dust was measured from the soy treated area 8 days after application. This data was collected over 3 minutes as the vehicle drove 30 mph for 1.5 miles.

Utilize Dust Collection Equipment to Study the Performance of the Applied Dust Control Agents Over Time Measurement of road dust generation is performed utilizing a dust monitoring device from TSI Inc. called the DustTrack II™. Preliminary data collected from this apparatus is shown in FIG. 11. The test method consisted of a 3 minute sampling time during which the vehicle was driven at 30 mph across the treated section of road followed by an untreated section of road for a total distance of 1.5 miles. The data shown in the FIG. 11 is the direct output of the instrument and shows that the soy treated section of the road has no discernable dust generated after 8 days from application. A dramatic spike in the dust level occurs when the vehicle leaves the treated section and travels into the untreated section for the reminder of the measurement.

Post-Application Observations

Figure 12:
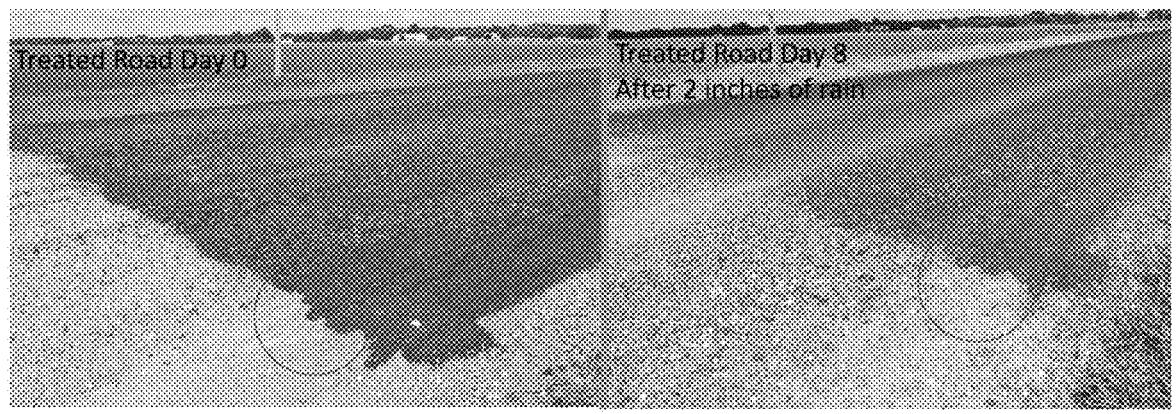
FIG. 12 shows a treated road shortly after application and eight days later. The margins of the treated area remain distinct even after heavy rainfall.
Figure 13:
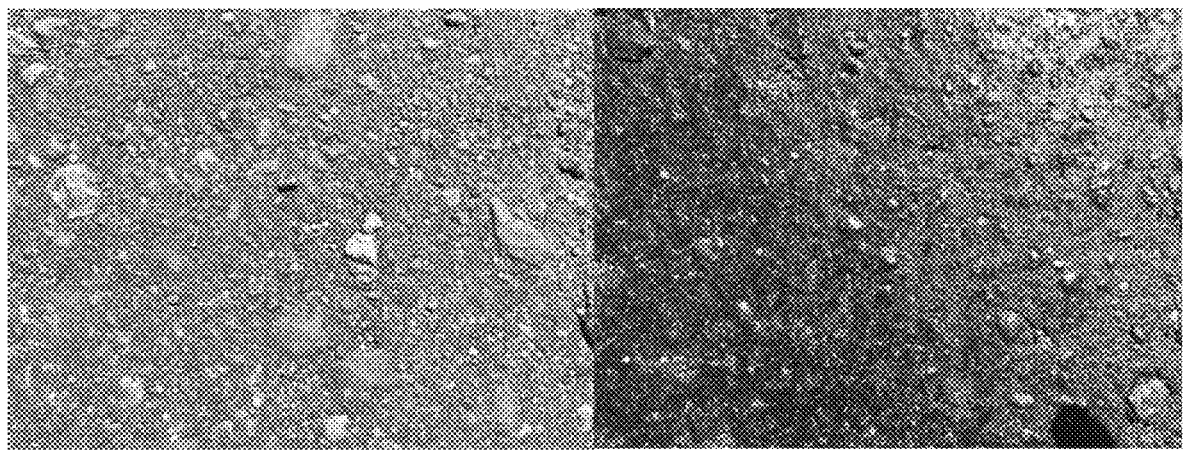
FIG. 13 shows select regions of treated roadbed 1 week after application. Prior to these photos being taken the region received ~2 inches of rainfall yet the material appears to have stayed in place. The darker photo on the right was an area of road that was very hard prior to application, which limited the penetration of the material and resulted in a higher surface concentration.

The soy based material was not compromised by the heavy rains experienced shortly after application. In fact, rain puddles observed on the soy treated section were clear and puddles from the untreated section were silty (FIG. 12). This is a promising indication that the soy based material binds the fine dust particles preventing loss of fines from the surface which accelerates road deterioration. Additional photographs of the soy treated roadbed one week after application are shown in in FIG. 13. They indicate that the soy treated gravel surface forms a firm and well consolidated surface that is stable and resistant to erosion. Despite the heavy rains prior to theses photographs, the surface of the road is still intact and dust free. The darker photograph is from a portion of the road that was both very hard and free of loose gravel prior to application. This likely limited the penetration depth of the material and resulted in an area that was over saturated. The result is that the roadbed in this area is firm, but has been softened slightly. The material will continue to cure and slowly penetrates deeper into the roadbed. The lighter colored photo appears to have the ideal amount of material applied as it penetrated the gravel fully leaving a firm, compact and stable surface. It also appears that in the darker region there may be some interaction between the soy based liquid and the recycled asphalt within the road surface causing the surface to look and act like asphalt.

The complete disclosures of all patents, patent applications including provisional patent applications, publications including patent publications and nonpatent publications, and electronically available material cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A composition comprising a biomaterial comprising a mixture of bio-derived glycerides, and asphalt and/or recycled asphalt, wherein the composition is formulated for use as an asphalt rejuvenator or a dust control agent.

2. The composition of claim 1, wherein the bio-derived glycerides comprise at least one glyceride selected from the group consisting of a monoglyceride, a diglyceride, and a triglyceride.

3. The composition of claim 2 further comprising glycerol, and wherein the bio-derived glycerides comprise at least one monoglyceride, at least one diglyceride, and at least one triglyceride.

4. The composition of claim 3, wherein the biomaterial comprises heterogeneous bio-derived glycerides.

5. The composition of claim 1, wherein the bio-derived glyceride is produced from a reaction between glycerol and a biodegradable or bio-derived fatty acid ester.

6. The composition of claim 5, wherein the glycerol is obtained from an organic waste stream.

7. The composition of claim 5, wherein the biodegradable or bio-derived fatty acid ester comprises a plant oil, an animal fat, or a fatty acid methyl ester (FAME).

8. The composition of claim 7, wherein the plant oil comprises soybean oil.

9. The composition of claim 7, wherein the fatty acid methyl ester comprises biodiesel.

10. The composition of claim 1, further comprising at least one additive selected from the group consisting of a dust control agent, a cross-linking agent, a drying agent, a hygroscopic agent, a stabilizing agent, and a defoaming agent.

11. A method for making a biomaterial, the method comprising reacting glycerol and a biodegradable or bio-derived fatty acid ester under conditions to produce a biomaterial comprising at least one monoglyceride, at least one diglyceride, and at least one triglyceride.

12. The method of claim 11, wherein the glycerol comprises crude glycerol from an organic waste stream.

13. The method of claim 11, wherein the biodegradable or bio-derived fatty acid ester comprises at least one of soybean oil or biodiesel.

14. The method of claim 13 wherein the biodiesel is crude biodiesel.

15. A method for rejuvenating asphalt or controlling dust on a road or soil surface comprising applying the composition of claim 1 to the road or soil surface.

16. The method of claim 15, wherein the composition further comprises at least one additive selected from the group consisting of a dust control agent, a cross-linking agent, a drying agent, a hygroscopic agent, a stabilizing agent, and a defoaming agent.

17. The method of claim 15, wherein the composition comprises an aqueous composition, and wherein the biomaterial is dissolved, suspended or emulsified in the aqueous composition.

18. The method of claim 15, further comprising applying a cross-linking agent or drying agent to the road surface after application of the biomaterial.

19. A road construction material comprising asphalt and/or recycled asphalt and a biomaterial comprising a mixture of bio-derived glycerides.

20. A method for making the road construction material of claim 19, comprising blending the asphalt or recycled asphalt and the biomaterial.

21. The method of claim 20, wherein the biomaterial is emulsified in water.

22. The method of claim 20, wherein the biomaterial is anhydrous.

23. A method for making a roadbed or road surface, comprising forming the roadbed or road surface from the material of claim 19.

24. A method for stabilizing a gravel road surface, the method comprising:
   contacting a gravel road surface with a composition comprising a biomaterial comprising a mixture of bio-derived glycerides, wherein the gravel road surface comprises 5-100% recycled asphalt (RAP), and wherein the contact results in a stable surface with enhanced binding of the recycled asphalt.

25. The method of claim 24, wherein the composition comprises a water emulsion.

26. The method of claim 24, wherein the composition is anhydrous.

27. A method for rejuvenating a worn or deteriorated asphalt or recycled asphalt road, comprising applying the composition of claim 1 to the road surface.

28. The method of claim 27, wherein the composition comprises a water emulsion.

29. The method of claim 27, wherein the composition is anhydrous.

30. A road surface or roadbed comprising the composition of claim 1.

* * * * *